United States Patent
Dinur

(10) Patent No.: US 8,437,276 B2
(45) Date of Patent: May 7, 2013

(54) CONTROL SYSTEMS, COMMISSIONING TOOLS, CONFIGURATION ADAPTERS AND METHOD FOR WIRELESS AND WIRED NETWORKS DESIGN, INSTALLATION AND AUTOMATIC FORMATION

(75) Inventor: Jehuda Julian Dinur, Haifa (IL)

(73) Assignee: Tridinetworks Ltd., Nesber (IL)

(*) Notice: Subject to any disclaimer, the term of this patent is extended or adjusted under 35 U.S.C. 154(b) by 119 days.

(21) Appl. No.: 12/680,383
(22) PCT Filed: Nov. 19, 2008
(86) PCT No.: PCT/IL2008/001517
§ 371 (c)(1),
(2), (4) Date: Mar. 26, 2010
(87) PCT Pub. No.: WO2009/069118
PCT Pub. Date: Jun. 4, 2009

(65) Prior Publication Data
US 2011/0007665 A1   Jan. 13, 2011

Related U.S. Application Data

(60) Provisional application No. 61/004,794, filed on Nov. 29, 2007.

(51) Int. Cl.
*H04B 7/00*    (2006.01)
*H04W 40/00*   (2009.01)
*G06F 15/173*  (2006.01)

(52) U.S. Cl.
USPC ............ 370/254; 370/310; 455/446; 709/223

(58) Field of Classification Search .......... 370/252–254, 370/310–343; 455/352–423; 340/517–541; 709/223–229
See application file for complete search history.

(56) References Cited

U.S. PATENT DOCUMENTS 6,653,933 B2   11/2003   Raschke et al.
6,831,569 B2   12/2004   Wang et al.

(Continued)

FOREIGN PATENT DOCUMENTS

EP   1 009 139   6/2000
EP   1 521 401   4/2005

(Continued)

OTHER PUBLICATIONS

Knauth et al., "SARBAU—An IP-Fieldbus Based Building Automation Network", Emerging Technologies and Factory Automation, 2008, ETFA 2008, IEEE International Conference on, IEEE, Piscataway, NJ, USA, Sep. 15, 2008, pp. 13-16.

(Continued)

*Primary Examiner* — Man Phan
(74) *Attorney, Agent, or Firm* — Pearl Cohen Zedek Latzer, LLP

(57) ABSTRACT

Design and control systems, commissioning tools, configuration adapters and a method for wireless and wired networks design, installation and automatic formation, including binding of the networks devices are provided. In the design system a scheme that uniquely identifies each network device by its type and its physical location is created and information for logical binding between the devices is prepared. In the design system is also created a device mapping that maps between the devices on the scheme and their network configuration data such as, radio IDs and startup attribute sets and wired communication link address. The data prepared in the design system is transferred to or accessed by a master controller and dedicated commissioning tools in the control system. According to devices' physical locations, appropriate configuration data is loaded from the commissioning tools into the devices through dedicated configuration adapters. The devices and their configuration adapters not necessarily have to be powered-up during configuration data loading. After power-up, the devices automatically update themselves with the loaded configuration data and the control system may initialize itself and identifies all the devices. The master controller in the control system uses the design system defined binding information and transmits binding commands for creating logical links between the devices and so networks may be automatically formed.

25 Claims, 15 Drawing Sheets

U.S. PATENT DOCUMENTS

| | | | |
|---|---|---|---|
| 6,859,644 B2* | 2/2005 | Wang | 455/159.2 |
| 7,032,018 B2 | 4/2006 | Lee et al. | |
| 7,124,101 B1 | 10/2006 | Mikurak | |
| 7,126,291 B2 | 10/2006 | Kruse et al. | |
| 7,184,770 B1* | 2/2007 | Narasimhan et al. | 455/446 |
| 7,211,968 B2* | 5/2007 | Adamson et | 315/295 |
| 7,400,594 B2* | 7/2008 | Pereira et al. | 370/310 |
| 7,681,231 B2* | 3/2010 | Combs et al. | 726/5 |
| 7,917,232 B2* | 3/2011 | McCoy et al. | 700/17 |
| 8,023,440 B2* | 9/2011 | Nass et al. | 370/310 |
| 8,040,815 B2* | 10/2011 | Silk et al. | 370/252 |
| 8,055,386 B2* | 11/2011 | McCoy et al. | 700/276 |
| 8,144,622 B2* | 3/2012 | Shepard et al. | 370/254 |
| 2002/0013723 A1 | 1/2002 | Mise | |
| 2003/0217186 A1 | 11/2003 | Bushey | |
| 2004/0111501 A1 | 6/2004 | Lee et al. | |
| 2005/0152294 A1 | 7/2005 | Yu et al. | |
| 2005/0165919 A1* | 7/2005 | Qian et al. | 709/223 |
| 2005/0201393 A1 | 9/2005 | Hatayama et al. | |
| 2005/0249169 A1 | 11/2005 | Fong | |
| 2006/0044152 A1 | 3/2006 | Wang | |
| 2006/0250980 A1 | 11/2006 | Pereira et al. | |
| 2006/0282885 A1 | 12/2006 | Combs et al. | |
| 2007/0054616 A1 | 3/2007 | Culbert | |
| 2007/0232288 A1* | 10/2007 | McFarland et al. | 455/423 |
| 2007/0233323 A1* | 10/2007 | Wiemeyer et al. | 700/276 |
| 2008/0056722 A1* | 3/2008 | Hendrix et al. | 398/108 |
| 2008/0057872 A1* | 3/2008 | McFarland et al. | 455/66.1 |
| 2008/0125873 A1 | 5/2008 | Payne et al. | |
| 2009/0276547 A1 | 11/2009 | Rosenblatt et al. | |
| 2010/0081375 A1 | 4/2010 | Rosenblatt et al. | |
| 2010/0082784 A1 | 4/2010 | Rosenblatt et al. | |

FOREIGN PATENT DOCUMENTS

| | | |
|---|---|---|
| WO | WO 00/51291 | 8/2000 |
| WO | WO 02/098060 | 12/2002 |
| WO | WO 2005/048042 | 5/2005 |
| WO | WO 2007/036886 | 4/2007 |
| WO | WO 2007/114035 | 10/2007 |

OTHER PUBLICATIONS

Supplementary European Search Report for Application No. EP 08 85 5279 mailed Feb. 4, 2011.

PN512—NFC Transmission Module (Manufactured by NXP Corporation), Rev. 3.3, Jun. 13, 2007, pp. 1-23.

P531x072/P531x036 (V0P/V0Q)—JCOP31 V2.3.1 on Secure Dual Interface PKI Smart Card Controller (Manufactured by NXP Corporation), Rev. 2.0, Aug. 28, 2007, pp. 1-25.

International Search Report and Written Opinion for International Application No. PCT/IL08/01517 mailed Mar. 25, 2009.

\* cited by examiner

CONTROL SYSTEMS, COMMISSIONING TOOLS, CONFIGURATION ADAPTERS AND METHOD FOR WIRELESS AND WIRED NETWORKS DESIGN, INSTALLATION AND AUTOMATIC FORMATION

CROSS-REFERENCE TO RELATED APPLICATIONS

This application is a National Phase Application of PCT International Application No. PCT/IL2008/001517, International Filing Date Nov. 19, 2008, claiming priority of U.S. Provisional Patent Application, 61/004,794, filed Nov. 29, 2007, which is incorporated herein by reference.

REFERENCE TO CROSS-RELATED APPLICATION

This application claims priority from U.S. Provisional Application No. 61/004,794, filed on Nov. 29, 2007, herein incorporated by reference in its entirety.

FIELD OF THE INVENTION

The present invention relates to a new and improved method for wireless and wired networks design, installation and automatic formation including binding of the networks devices by creating logical links between two or more devices.

BACKGROUND OF THE INVENTION

Wireless control of networks provides the capability of remotely controlling and monitoring devices in many areas such as home and commercial automation, industrial automation, lighting, and heating, ventilation and air conditioning (HVAC) control.

Wireless control networks are attractive for deployment of advanced control systems because they save the cost of cabling, labor, materials, testing and verification of the wiring and installation. However the installation, configuration of parameters for binding of the wireless devices requires highly skilled professionals, special equipment and complicated manual procedures.

As an example, the standard manual pairing/binding procedure of a light switch and a lamp (after the devices are installed and the network parameters are loaded) is:

Entering the switch's set up mode by pressing a specific push button and having a set amount of time to connect a lamp by pressing and holding an activation button on the lamp. This is a time consuming procedure that is prone to errors and is suitable only for small-scale installations.

Installing a wireless control network requires several main procedures to be performed on each wireless device after the network scheme, parameters, and activation are defined. These main procedures are:
1. Entering a unique ID (UID) such as a unique radio ID.
2. Entering a startup attribute set (SAS) such as a personal area network (PAN) ID of the network.
3. Identifying (connecting) the physical location of the device with its UID and its logical location and function on the network scheme.
4. Pairing/binding of controlling devices and sensors.

This installation challenge is increased when a large quantity of sensing devices needs to be paired to corresponding controlling devices.

There have been several attempts to solve these problems which are described in the following paragraphs. Most of them are time consuming and require expensive equipment and highly qualified personnel.

Culbert describes a RFID network arrangement, which is a system for automatic configuration and authentication of network devices in U.S. patent application Ser. No. 11/220,205 (2005), whose disclosures are incorporated herein by reference.

Culbert does not solve the problem of locating wireless devices and performing post installation configuration tasks. At installation time the devices are given "various communication setup and security parameters" from the base station. These parameters are configured by the user or by the factory.

Culbert does not specify how this information is stored in the base station, and specifically does not mention how devices are distinguished from one another.

Wang describes an initialization of wireless-controlled lighting systems in U.S. Pat. No. 6,859,644 (2005).

Device initialization according to Wang is a complex post-installation process. After devices are installed, there is a complex phase of initialization in which each device transmits a request for initialization and a local control master responds and verifies initialization. This process requires devices to be turned on, which consumes energy (critical for battery operated devices). In addition, in case there are many devices in the network, the process of initializing all the devices is time consuming.

Pereira describes a method and system for automated distributed pairing of wireless nodes of a communication network in U.S. patent application Ser. No. 11/120,799 (2005), whose disclosures are incorporated herein by reference.

Pereira uses a context manager node to determine location of devices and enable automated distributed pairing.

The technology used to determine location of devices is expensive and the algorithms are complex for a network where devices are mostly static. Furthermore, the user usually determines which nodes should be paired. The process of determining which nodes should be paired cannot be automated.

Combs describes a method to wirelessly configure a wireless device for wireless communication over a secure wireless network in U.S. patent application Ser. No. 11/150,376 (2005), whose disclosures are incorporated herein by reference.

The method according to Combs contains two phases of configuration. In the first phase devices are configured so they can communicate securely with the administrator. This phase can either be done by the manufacturer, or at the customer's site. The second phase takes place over a secure channel and configures devices so they can join the secure network. The method according to Combs requires pre-configuring the devices and bringing them close to an administrator (such as PC), requires software manipulation, is time consuming and is suitable only for small networks (such as networks of printers).

Kruse describes an independent radio frequency programming device and method for the automation of the setup process for a lighting system with lighting control devices and master controllers in U.S. Pat. No. 7,126,291 B2, whose disclosures are incorporated herein by reference.

In the method, according to Kruse, it is assumed that before the setup programming the system is powered-up and the devices are identified by the master controller. The programming device eavesdrops on the messaging traffic between the master controller and each device and is capable of automatically programming each one of the devices. Kruse doesn't mention how the devices are identified by the master controller. The pairing/binding and device locations are not mentioned.

There is a need for a simple automated method and system for initialization, location and binding of devices in large wireless networks.

SUMMARY OF THE INVENTION

The prior arts do not teach or suggest a simple automated method and system for initialization, location and binding of wireless and wired devices in large communication networks.

Design and control systems, commissioning tools, configuration adapters and a method according to the present invention, allow for large wireless and wired networks design, installation and automatic formation including binding of networks devices.

Wireless network devices are devices interconnected by wireless communication links. Wired network devices are devices interconnected by wired communication links. For illustrative purposes, consider an example of a wireless lighting control system for networks that include devices such as wired network lamp ballasts connected to a wireless device, wireless sensors (such as light intensity and presence), wireless switches, a master controller that wirelessly controls the networks through a wireless access point and a commissioning tool (used for operations such as the configuration of devices).

In the design system the networks may be designed, according to the present invention, in two main stages, the architectural and the electrical design stages.

In the architectural design stage, according to the present invention, networks scheme may be created and logical binding information (logical links) between the devices may be prepared. The scheme and the binding information may be created by the architectural designer and may be stored in a standard storage means (such as a database or CD). The networks scheme describes the networks in a human-friendly way and allows to easily locate devices on it. For example, the networks scheme may be a diagram which represents a floor in a building, the rooms on the floor and the physical location of the lamp ballasts and the lighting switches. The networks scheme uniquely identifies each device by its type and its physical location parameters, and combines both sets of parameters to a unique (wired or wireless) logical ID. The type will later be used by the networks installers to select a device from the set of available devices to be physically installed in the location specified by the networks scheme. For example, the type of a device can represent the serial ID of its version that is written on a tag of each device, the location of a device can be in the form of [building name, floor number, room number]. Binding information contains information that will later be used to link devices. It may be prepared using the networks scheme to create logical links between devices. The information contains pairs of devices as identified by the networks scheme. For example, the logical bindings can indicate which switch controls which lamp ballast.

In the electrical design stage, according to the present invention, two device mapping tables that contain configuration data may be formed: wired device mapping for wired devices, and wireless device mapping for wireless devices. The device mappings map between the devices on the networks scheme and their valid configuration data such as radio IDs and startup attribute sets for wireless devices, and wired communication link addresses for wired devices. The mappings may be used to correctly initialize the devices in the system. The mappings may also be used in order to locate each logical device described by the predefined scheme on the actual networks to be formed. Locating each device in the network allows to access, bind and reconfigure it using its valid configuration data. The wireless device mapping table may also contain an address translation sub-table. For each wireless device, the address translation sub-table maps the wired communication link address of each connected wired device to its endpoint (addressable component in a wireless device) used by the wireless protocols. The address translation sub-table allows each wireless device to locate and communicate with each attached wired device, providing an indirect communication link between the wireless and wired networks.

The data prepared in the design system may be transferred to or accessed by a master controller in the control system and may be transferred to or accessed by dedicated commissioning tools.

The next stage after the networks design, according to the present invention, may be the networks installation. The installers may locate each device in the mapping table in the commissioning tools according to its physical location and type as defined in the networks scheme. The data from the commissioning tools may be downloaded into the wireless devices through their dedicated configuration adapters. The download may be carried out by contactless technologies (such as RFID/NFC) or by contact technologies (such as 1-Wire). The data may be downloaded into the wired network devices through their dedicated configuration adapters. The download can be carried out in the same way as for the wireless devices or for simple cases, manually (for example, by setting switches). After the device is loaded it is mounted in its physical location as defined in the networks scheme. The devices and the configuration adapters do not necessarily have to be powered-up during configuration data loading.

During the initialization stage, according to the present invention, the networks may be powered-up and initialized. The wireless devices update themselves with the downloaded configuration data. For each wireless device, part of this data may be the address translation sub-table entries, which include the wired communication link address and endpoint (addressable component in a wireless device) of each wired device connected to its wired communication link. The wired communication link address of each wired device is updated according to the address loaded in its configuration adapter.

After the networks are initialized, all the devices are recognized by the master controller. The master controller uses the wireless device mapping and the address translation sub-table in the wireless device mapping to translate the design system prepared binding information to valid binding commands containing valid configuration data: Radio IDs, endpoints, and additional data as required by wireless protocols. The binding commands are transmitted to the wireless devices for creating logical links between different devices and the bindings are automatically formed. The binding information may be downloaded into devices together with the other configuration data if the memory/storage in the configuration adapter is large enough.

According to the present invention there is provided a method of networks design, installation, and formation, the method including the main stages of: (a) starting the networks, design, installation and formation; and (b) designing the networks.

According to further features of the method there is the main stage of: (c) installing the networks.

According to further features of the method there is the main stage of: (d) forming the networks.

According to other further features of the method there is the main stage of: (d) automatically forming the networks.

According to still further features of the method there is the main stage of: (e) ending the networks design, installation, and formation.

According to further features of the method the main stage of starting the networks design, installation, and formation includes the stage of: (i) providing a design system.

According to further features of the method the main stage of designing the networks includes the stages of: (i) defining at least two devices type and physical locations of the at least two devices; (ii) defining binding links between the at least two devices; (iii) defining a wired device mapping; (iv) defining wireless device mapping; and (v) defining an address translation sub-table for wireless devices.

According to further features of the method the main stage of starting the networks design, installation, and formation includes the stage of: (i) providing a design system.

According to still further features of the method—the main stage of installing the networks includes the stage of: (i) installing at least one wireless device.

According to still further features of the main stage of installing the networks further includes the stages of: (ii) installing at least one wired device.

According to still further features of the method the main stage of automatically forming the networks includes the stages of: (i) initializing the at least one wireless device; (ii) initializing the at least one wired device; and (iii) bindings formation.

According to other further features of the method—the main stage of installing the networks includes the stage of: (i) forming at least one wireless network.

According to still further features of the method the main stage of forming the networks further includes the stages of: (i) initializing at least one wired device; and (ii) bindings formation.

According to the present invention there is provided a method of networks installation and formation, the method including the stages of: (i) installing at least one wireless device.

According to further features of the method further including the stages of: (ii) installing at least one wired device; (iii) initializing the at least one wireless device; (iv) initializing the at least one wired device; and (v) bindings formation.

According to other features of the method the stage of defining a wired device mapping includes the sub-stages of: (A) using a master controller to automatically insert a wired logical ID of at least one wired device to a device mapping; and (B) using the master controller to automatically allocate addresses for the at least one wired device.

According to other features of the method the stage of defining a wireless device mapping includes the sub-stages of: (A) defining a SAS for each of the wireless devices on a networks scheme; (B) using a master controller to automatically start to create a device mapping from a wireless logical ID of each of the wireless devices and its the SAS; (C) using a master controller to initiate a radio ID allocation; (D) using the master controller to allocate a radio ID for each of the wireless logical IDs; and (E) forming an additional address translation sub-table which specifies wired communication link addresses and an endpoint for each of the wired devices attached to each one of the wireless devices.

According to other features of the method the stage of defining an address translation sub-table for wireless devices includes the sub-stages of: (A) using a master controller to initiate address translation sub-table calculation; (B) using the master controller to automatically take a wired logical sub-ID and wired communication link address for each wired device from the wired device mapping and fill it in the address translation sub-table; and (C) entering an endpoint identifier.

According to other features of the method the stage of installing at least one wireless devices includes the sub-stages of: (A) physically installing the at least one wireless device according to type and location taken from a networks scheme as it appears on a commissioning tool; (B) marking the physically installed at least one wireless device on the commissioning tool; (C) bringing the commissioning tool into at least proximity of a physically installed configuration adapter of wireless device; and (D) initiating data download from the commissioning tool to the configuration adapter of wireless device using a tool's user interface, wherein there is no need to power-up configuration adapter of the wireless device.

According to other features of the method the stage of installing at least one wired device includes the sub-stages of: (A) physically installing the at least one wired device according to type and location taken from a networks scheme as it appears on a commissioning tool; (B) marking the physically installed at least one wired device on the commissioning tool; (C) bringing into at least proximity the commissioning tool with the at least one installed wired device; and (D) initiating data download from the commissioning tool to the at least one wired device using a tool's user interface, wherein there is no need to power-up the wired device.

According to other features of the method the stage of initializing at least one wireless device including the sub-stages of (A) powering up the at least one wireless device; (B) reading an ID, which is downloaded from a commissioning tool into a configuration adapter of the at least one wireless device; (C) reading address translation sub-table entries, and using the entries to locate and communicate with each attached wired device; (D) providing an indirect communication link between the wireless and wired networks; (E) using the ID as its radio ID; and (F) reading a SAS, which is downloaded from the commissioning tool into the configuration adapter of wireless device, and using the SAS and radio ID to join a designated wireless network.

According to another feature of the method the stage of initializing at least one wired device includes the sub-stages of: (A) powering up the at least one wired device; and (B) reading data, which is downloaded from a commissioning tool into the configuration adapter of the wired device, and using an address for the specific wired communication protocol.

According to another feature of the method the stage of bindings formation includes the sub-stages of: (A) using a master controller to initiate a binding process; (B) reading binding information by the master controller, and using a wireless device mapping and an address translation sub-table in a wireless device mapping in order to translate wired logical IDs of wired devices found in the binding information to radio IDs and endpoints; and (C) transmitting binding commands by the master controller.

According to the present invention there is provided a control system for controlling of wireless and wired networks, the control system including: (a) a wired network, wherein the wired network includes at least one wired device; and (b) a wired communication link, wherein the wired communication link is connecting the at least one wired device in the wired network.

According to further features of the control system, the control system further includes: (c) a wireless device, wherein the wireless device has a wired communication interface for communicating with the wired network through the wired communication link; (d) a wireless network, the wireless network including at least one wireless device; and (e) a wireless communication link, wherein the wireless communication link is interconnecting the at least one wireless devices in the wireless network.

According to further features of the control system, the control system further includes: (f) at least one access point, the access point is connected to at least one network wherein the network is selected from a group consisting of the wired network and the wireless network; (g) a master controller with access to a networks scheme; and (h) at least one configuration adapter with a configuration interface and a device contact interface.

According to further features of the control system, at least one wired device, at least one commissioning tool, the wireless device, and the at least one access point has a configuration adapter for a complementary configuration link, wherein only the configuration adapter of the commissioning tool must be powered-up during a configuration data loading.

According to further features of the control system, the control system further including: (g) a configuration link for downloading configuration data; (h) at least one device contact interface for connecting to each of the at least one wired devices device for reading configuration data; (i) at least one contact device interface for connecting to each of the at least one wireless devices for reading configuration data; (j) a configuration link operating powerless; (k) at least one commissioning tool for downloading configuration data into the configuration adapter of wired devices, into the configuration adapter of access point and into the configuration adapter of wireless devices; (i) at least one device contact interface for connecting to each of the at least one commissioning tools for writing configuration data; and (j) at least one device contact interface for connecting to each of the at least one access point for reading configuration data.

According to further features of the control system at least one configuration adapter includes binding information.

BRIEF DESCRIPTION OF THE DRAWINGS

The invention is herein described, by way of example only, with reference to the accompanying drawings, wherein.

DETAILED DESCRIPTION OF EMBODIMENTS

Figure 1:
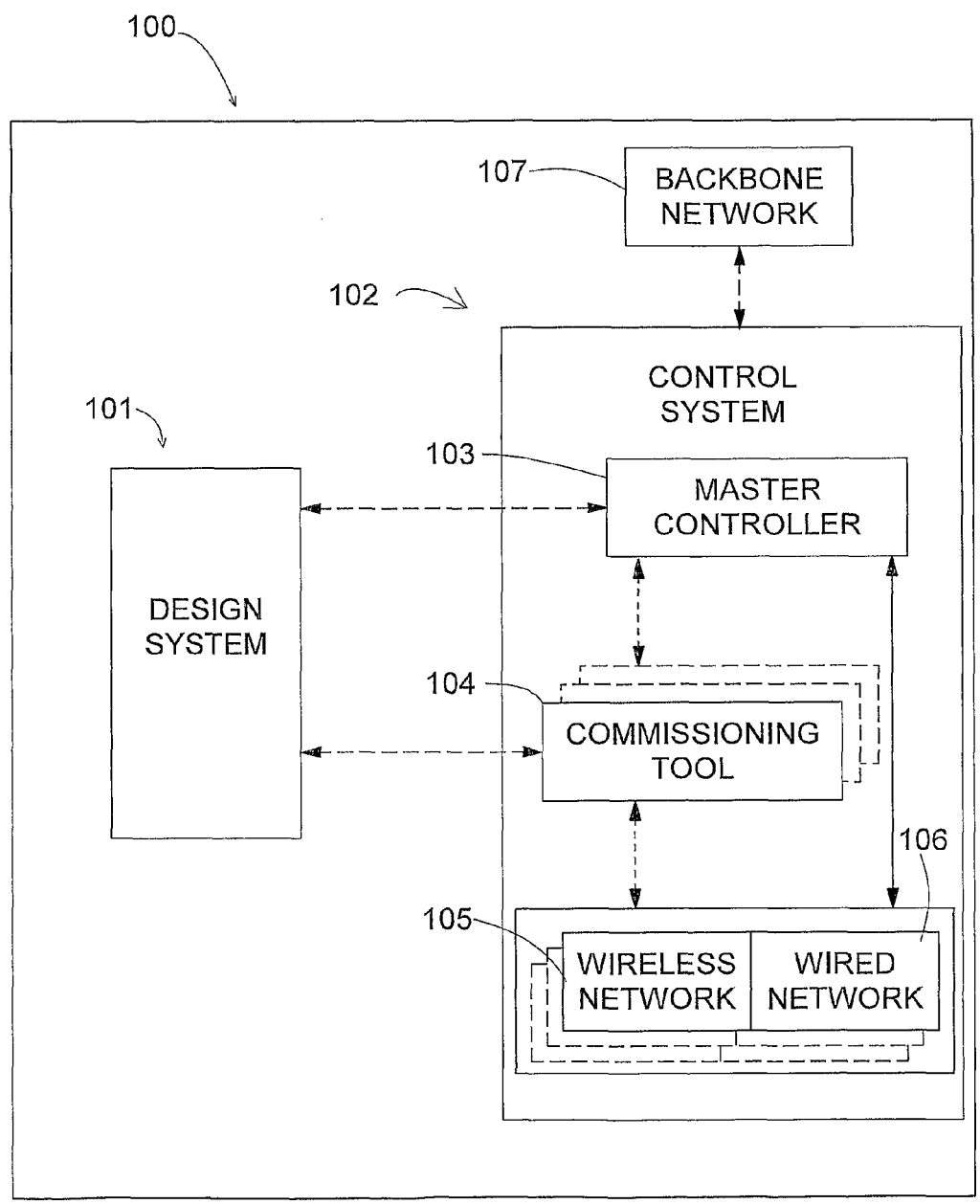
FIG. 1 is a schematic diagram of an embodiment of a design and control systems according to the present invention.

The present invention is of design and control systems, commissioning tools, configuration adapters and a method for wireless and wired networks design, installation and automatic formation including binding of networks devices.

The principles and operation of the design and control systems, commissioning tools, configuration adapters and a method for design, installation and automatic networks formation including binding of networks devices according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings.

Unless otherwise defined, all technical and scientific terms used herein have the same meaning as commonly understood by one of ordinary skill in the art to which this invention belongs. The materials, dimensions, methods, and examples provided herein are illustrative only and are not intended to be limiting.

The following list is a legend of the numbering of the application illustrations:

| | |
|---|---|
| 100 | design and control systems |
| 101 | design system |
| 102 | control system |
| 103 | master controller |
| 104 | commissioning tool |
| 105 | wireless network |
| 106 | wired network |
| 107 | backbone network |
| 200 | access point |
| 201 | wired device |
| 202 | wireless device |
| 203 | wireless communication link |
| 204 | configuration adapter |
| 205 | RF (radio frequency) transceiver |
| 206 | wired communication link |
| 207 | configuration link |
| 300 | design system controller with design application |
| 301 | database |
| 302 | design system communication interface |
| 400 | CT (commissioning tool) controller |
| 401 | (design/control) system interface |
| 402 | CT (commissioning tool) user interface |
| 500 | wireless device controller |
| 501 | wired communication interface |
| 502 | wireless device user interface |
| 503 | sensor interface |
| 600 | AP (access point) controller |
| 700 | control and memory module |
| 701 | device contact interface |
| 702 | configuration interface |

-continued

| | |
|---|---|
| 800 | networks scheme |
| 801 | wireless large fluorescent |
| 802 | wireless standard device |
| 803 | wired standard fluorescent in the left wing |
| 804 | wired standard fluorescent in the right wing |
| 805 | wireless 1 - gang switch |
| 806 | wireless 3 - gang switch |
| 807 | left switch |
| 808 | middle switch |
| 809 | right switch |
| 810 | floor #2 |
| 811 | hallway |
| 812 | room #1 |
| 813 | room #2 |
| 814 | single switch |
| 815 | large fluorescent |

As used herein in the specification and in the claim section that follows, the terms: access point, address translation sub-table, binding, cluster, coordinator, commissioning tool, configuration adapter, configuration data, (communication) link, device, end device, end point, HVAC, I²C, network, NFC, master controller, PAN, RFID, router, system, networks scheme, SAS, SPI, USB, wired device, wireless device, wireless logical ID, wired logical sub-ID, wired logical ID, wireless device mapping, and wired device mapping, are as specified in the following list:

The term "access point" and the like substantially refer to a device that connects (directly or through communication adapters such as switches) the master controller to the wireless and wired networks.

The term "address translation sub-table" and the like substantially refer to a translation of the wireless device endpoint identifiers of attached wired devices to their wired communication link address.

The term "binding" and the like substantially refer to a unidirectional logical link between a source endpoint and a destination endpoint that run the same application.

The term "cluster" and the like substantially refer to a collection of commands and attributes/states.

The term "coordinator" and the like substantially refer to a wireless device responsible for starting and maintaining a wireless network.

The term "commissioning tool" and the like substantially refer to a (usually portable) unit used to deploy and configure devices.

The term "configuration adapter" and the like substantially refer to a component in a device or connected to a device which receives and stores configuration data.

The term "configuration data" and the like substantially refer to a set of attributes (such as radio ID and startup attribute set) that determines the initial behavior of the wireless device.

The term "(communication) link" and the like substantially refer to a means of connecting one device to another for the purpose of transmitting and receiving data.

The term "device" and the like substantially refer to a system/network component (either a wired device or a wireless device).

The term "end device" and the like substantially refer to a device that can only communicate with the routers and the coordinator (can't relay messages).

The term "end point" and the like substantially refer to an addressable component in a wireless device.

The term "HVAC" and the like substantially refer to heating, ventilation and air conditioning.

The term "I²C" and the like, substantially refer to an inter integrated circuit bus.

The term "network" and the like substantially refer to a series of devices interconnected by communication links.

The term "NFC" and the like substantially refer to a near field communication.

The term "master controller" and the like, substantially refer to a component responsible for the control system management.

The term "PAN" and the like, substantially refer to a personal area network.

The term "RFID" and the like substantially refer to radio frequency identification.

The term "router" and the like substantially refer to a device providing routing/relay services to the network/system.

The term "system" and the like substantially refer to a collection of elements (hardware & software) that are organized for a common purpose.

The term "networks scheme" and the like substantially refer to a diagram of the installation site that uniquely identifies each device by its type and its physical location (e.g. a map, or a table on which every device is located by coordinates).

The term "SAS" and the like, substantially refer to a Startup Attribute Set.

The term "SPI" and the like, substantially refer to a serial peripheral interface bus.

The term "USB" and the like, substantially refer to a universal serial bus.

The term "wired device" and the like substantially refer to a device without a wireless transceiver.

The term "wireless device" and the like substantially refer to a device with a wireless transceiver.

The term "wireless logical ID" and the like substantially refer to an identifier that identifies each wireless device on the networks scheme by the wireless device location and the wireless device type.

The term "wired logical sub-ID" and the like substantially refer to an identifier that identifies each wired device attached to each wireless device on the networks scheme by the wired device location and the wired device type.

The term "wired logical ID" and the like substantially refer to an identifier that identifies each wired device on the networks scheme by the wireless logical ID to which it is attached and its own wired logical sub-ID.

The term "wireless device mapping" and the like substantially refer to a table which maps the wireless logical ID of each wireless device to its radio ID, SAS and address translation sub-table entries.

The term "wired device mapping" and the like substantially refer to a table which maps the wired logical ID of each wired device to its wired network address.

Detailed System Description

A method for wireless and wired networks design, installation and automatic formation, according to the present invention, is shown in Table 1.

TABLE 1

| No | Stage Name | Output | Process |
|---|---|---|---|
| A | Architectural design | Networks scheme and binding table | Define device type and physical location A1<br>Define binding links between devices A2 |

TABLE 1-continued

| No | Stage Name | Output | Process |
|---|---|---|---|
| B | Electrical design | Devices mapping tables | Allocate SAS (Startup Attribute Set) for each device B1<br>Allocate radio ID B2<br>Allocate endpoints B3<br>Allocate wired link addresses B4<br>Address translation table/sub-table created B5 |
| C | Networks installation | Configured and physically installed devices | Remotely access or download the data created in the design stages into the commissioning tool C1<br>Download configuration data into the configuration adapter of each wired device C2<br>Download configuration data into the configuration adapter of each wireless device C3<br>Physically install each device according to its location in the networks scheme C4 |
| D | Networks initialization | Powered-up and initialized networks | Wireless devices read the downloaded data and join a wireless network D1<br>Wired devices read the downloaded data and a wired network is formed D2 |
| E | Bindings formation | Binding links between devices | Master controller accesses the data created in the design stages E1<br>Master controller sends binding commands to the wireless devices E2 |

The method for wireless and wired networks design, installation and automatic formation includes the follows stages: A) architectural design; B) electrical design; C) networks installation; D) networks initialization and E) bindings formation.

During the architectural design stage A, the device types and physical location A1 and the binding links A2 may be defined. The output of architectural design A may be the networks scheme and the binding table.

During the electrical design stage B startup attribute set B1, radio ID B2, endpoints B3 and wired (communication) link addresses B4 may be allocated to each device and an address translation sub-table may be created B5. The address translation sub-table allows the wireless devices to locate and communicate with each attached wired device, providing an indirect communication link between the wireless and wired networks. The output of the electrical design stage B may be the device mapping tables for the wired and the wireless devices. The device mapping tables map between the devices on the networks scheme and their allocated parameters.

During the networks installation stage C the data created in the design stages A and B may be remotely accessed or downloaded into the commissioning tool C1, configuration data from the commissioning tool may be downloaded/set into the configuration adapter of each wired device C2, configuration data from the commissioning tool may be downloaded into the configuration adapter of each wireless device C3 and each device is physically installed according to its location in the networks scheme C4. The output of the networks installation C may be configured and physically installed devices.

During the networks initialization stage D, the devices are powered-up, the wireless devices may read the downloaded data initialize themselves and join a wireless network D1 and the wired devices may read the downloaded/set data, initialize themselves and a wired network is formed. The output of the networks initialization D may be the powered-up and initialized networks.

During the bindings formation stage E, data created in the design stages A and B may be accessed by the master controller E1, the master controller may send binding commands to the wireless devices to form logical links between network devices E2. The output of the bindings formation stage E may be binding links between the network devices.

Referring now to the drawings, FIG. 1 is a general schematic diagram of an embodiment of a design and control systems 100, according to the present invention.

The design data created in the architectural and electrical design stages and stored in a design system 101 may be downloaded into or accessed and used by a master controller 103 of a control system 102 to control wireless networks 105 and wired networks 106. The design data may also be downloaded into or accessed and used by commission tools 104 for the wireless networks 105 and wired networks 106 installation and formation, as explained in the following.

The master controller 103 may have a provision to connect to a backbone network 107, a higher level network (such as of a BMS—building management system).

The continuous line with arrows indicates that the communication between the connected units is continuous during the systems operation.

The dotted lines with arrows indicate that the communication between the connected units may be temporary for specific purposes, as explained in the following.

Figure 2:
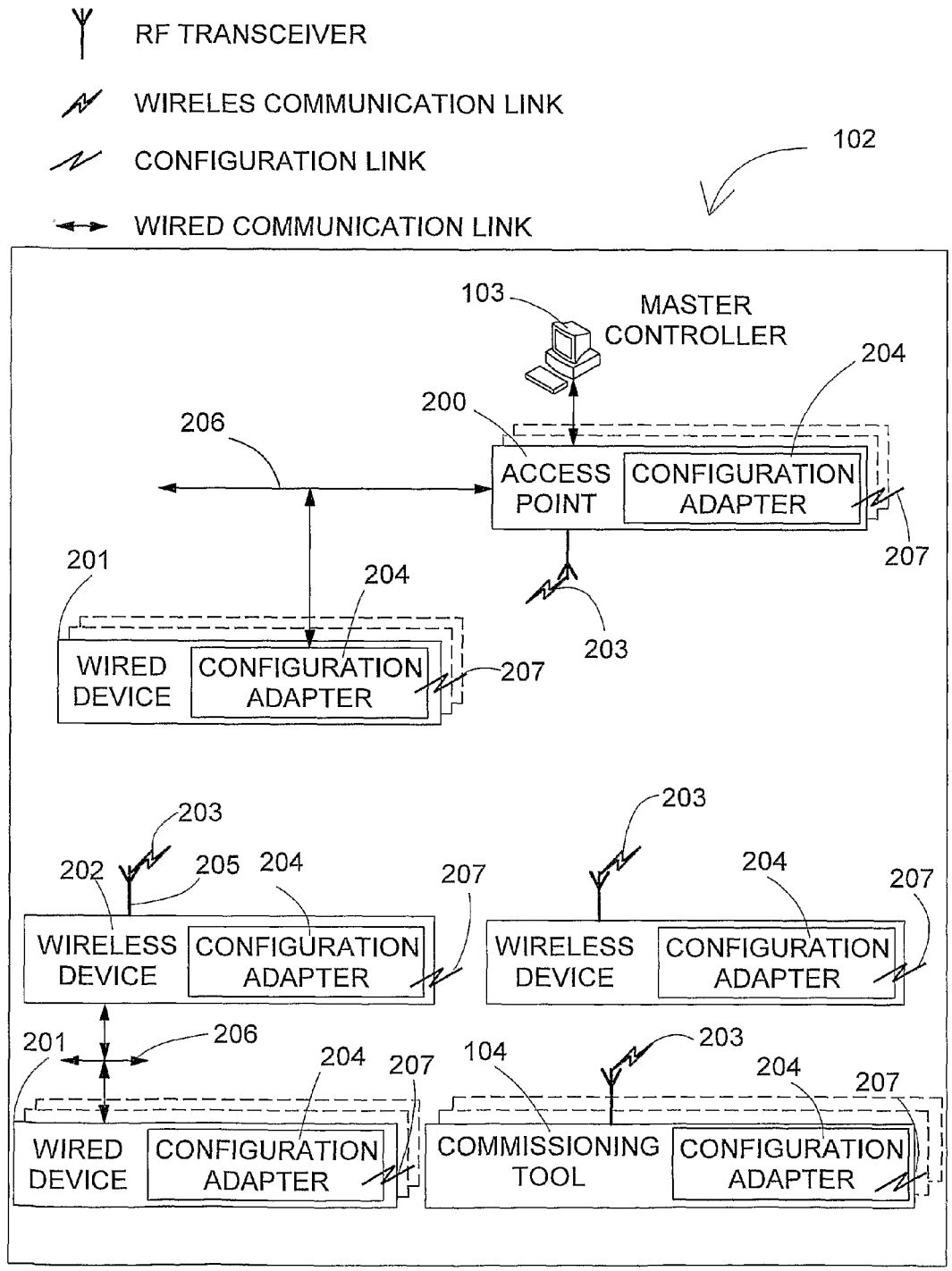
FIG. 2 is a schematic diagram of an embodiment of a control system, according to the present invention.

FIG. 2 is a schematic diagram of an embodiment of a control system 102 according to the present invention.

The control system's 102 main components include wired devices 201, wireless devices 202, a master controller 103, configuration adapters 204, access points 200 and commissioning tools 104.

Wired devices 201 are connected through a wired communication link 206, such as digital addressable lighting interface (DALI) to wireless devices 202 or to the access points 200. Wireless devices 202 and access points 200 may have 0, 1, or more attached wired communication links 206. The total number of wired devices 201 connected to the wireless device 202 is limited by the maximum number of endpoints available in the wireless device 202, as defined by the specific wireless protocol. Wireless devices 202 with attached wired devices 201 transfer the network control functions to the wired devices 201 via the wired communication link 206 using a wired communication protocol (such as DALI). The wireless devices 202 include a RF transceiver 205 for the wireless communication link 203, (such as ZigBee) and a configuration adapter 204 for a complementary contactless or contact configuration link 207 (such as contactless RFID or wired 1-Wire). The configuration adapter 204 is used for transferring the configuration data that determines the initial behavior of the device, (wire devices 201 or wireless devices 202) or access points 200. Each wired device 201 has a configuration adapter 204 for receiving the configuration data required for the initial operation of it. In some networks the configuration adaptor 204 may be implemented internally in the wired devices 201 or wireless devices 202, and in other networks, the configuration adapter 204 may be an external component.

A master controller 103 (such as a PC), controls groups of wireless devices 202, called wireless networks (105) and groups of wired devices 201 called wired networks (106).

The networks control functions from the master controller 103 are transferred through the access point 200 through the wireless communication link 203 or through the wired communication link 206.

The master controller 103 may control a plurality of wireless networks (105) and wired networks (106) through different access points 200.

Commissioning tools 104 (such as a PDA) may access/download and use the design data created in the design system 101 to download configuration data through the configuration link 207 of the configuration adapter 204 into the wireless devices 202 into the wired devices 201 and into the access points 200.

The master controller 103 may use the access points 200 with configuration adapters 204 as commissioning tools 104.

Figure 3:
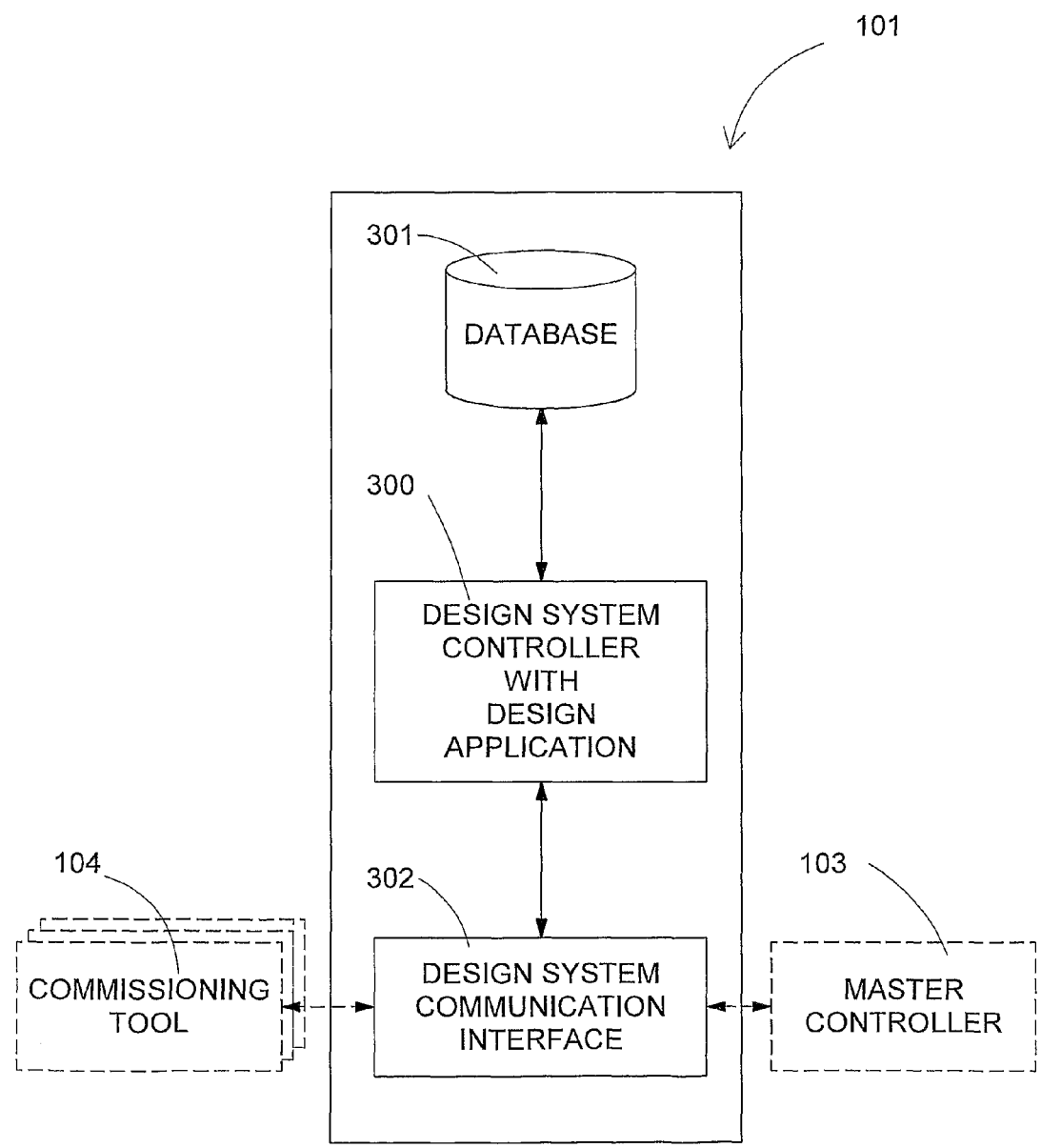
FIG. 3 is a schematic diagram of an embodiment of a design system, according to the present invention.

FIG. 3 is a schematic diagram of an embodiment of the design system 101 according to the present invention.

The design system's 101 main components include database 301, design system controller with design application 300 and design system communication interface 302.

The design data created by the design system controller with the design application 301 (such as a PC) may be stored in the database 301. The database 301 stores the networks scheme, device mapping tables and binding information. The database 301 may be accessed by downloaded into or the master controller 103 and by the commissioning tools 104 through the design system communication interface 302.

Detailed Devices Description

Figure 4:
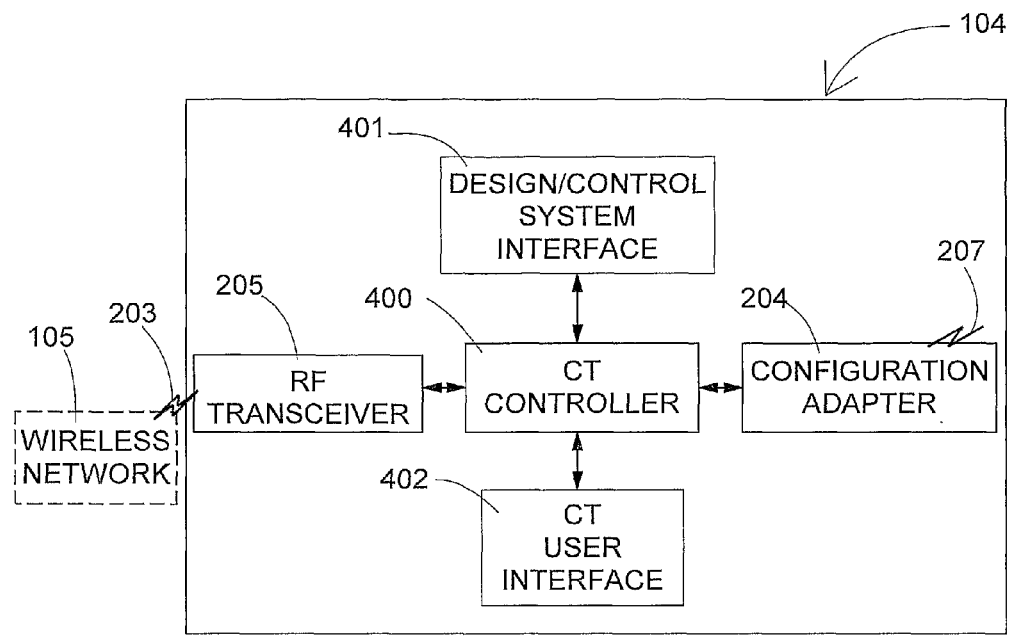
FIG. 4 is a schematic block diagram of a commissioning tool, according to the present invention.

FIG. 4 is a schematic block diagram of a CT (commissioning tool) 104, according to the present invention.

The control/design system interface 401 may be a standard serial communication interface (such as USB or Ethernet), wireless interface (such as Wi-Fi) or a cellular interface (such as GSM) and is used to connect the commissioning tool 104, to the master controller (103), not shown in the present illustration, to a local storage media (such as a CD) not shown in the present illustration, or to the design system (101), not shown in the present illustration, and to remotely access or load the design data. The configuration adapter 204 is used to download the configuration data, through the configuration link 207, into the configuration adapter 204 in the devices.

The download can be carried out by contactless technologies (such as RFID/NFC) or by contact technologies (such as 1-Wire). The RF transceiver 205 is used to connect to the wireless network 105 through the wireless communication link 203 for purposes such as testing and maintenance.

The wireless network 105 may be implemented by a low-rate, low-power wireless standard protocol (such as ZigBee). The CT controller 400 coordinates the functioning of the device and may be implemented by a standard microcontroller. The CT user interface 402 allows the user to perform operations such as to browse through the networks scheme or device mapping tables, to select the appropriate downloadable data and to initiate operations such as download data, read back, etc. The CT user interface 402 may be implemented by standard interface technologies (such as touch screen and push buttons).

Figure 5:
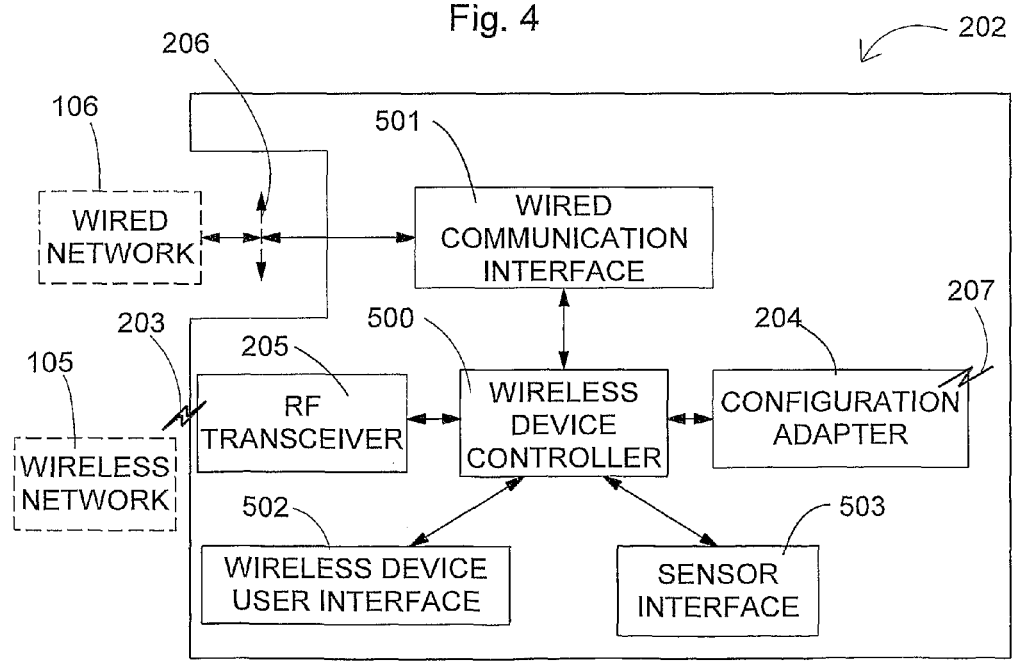
FIG. 5 is a schematic block diagram of a wireless device, according to the present invention.

FIG. 5 is a schematic block diagram of a wireless device 202, according to the present invention.

The wired communication interface 501 may be a standard communication interface for control (such as DALI) and is used to connect the wireless device 202 to the wired network 106, through the wired communication link 206. The configuration adapter 204 is used to receive the configuration data, through the configuration link 207, downloaded from the commissioning tool (104), and not shown in the present illustration. In case that the master controller (103), not shown in the present illustration, is used as a commissioning tool (104), not shown in the present illustration, the configuration adapter (of access point) 204 is used to download the configuration data into the configuration adapter 204 of the devices, through the configuration link 207.

The download may be carried out by contactless technologies (such as RFID/NFC) or by contact technologies (such as 1-Wire). The RF transceiver 205 may be used to connect to the wireless network (105) through the wireless communication link 203. It may be implemented by a low-rate, low-power wireless standard protocol (such as ZigBee). The sensor interface 503 connects the wireless device (202), not shown in the present illustration, to different types of sensors (such as presence, temperature and lighting intensity) through a standard sensor interface bus (such as I$^2$C or 1-Wire). The wireless device controller 500 coordinates the functioning of the device and may be implemented by a standard microcontroller. The wireless device user interface 502 allows the user to perform operations such as to manually control the wired devices (201), set parameters for interaction with sensors, not shown in the present illustration, etc. The wireless device user interface 502 may be implemented by standard interface technologies (such as touch screen and push buttons).

Figure 6:
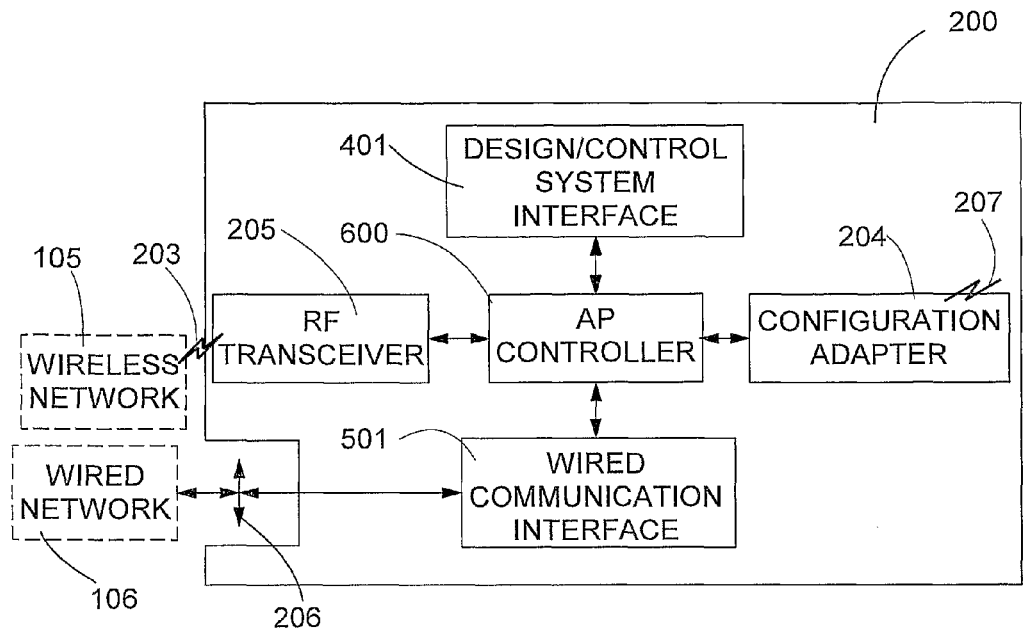
FIG. 6 is a schematic block diagram of an access point, according to the present invention.

FIG. 6 is a schematic block diagram of AP (access point) 200, according to the present invention.

The design/control system interface 401 may be a standard communication interface (such as USB, Ethernet or Wi-Fi) and is used to connect the access point (200), not shown in the present illustration, (directly or through an interface gateway) to the master controller (103), not shown in the present illustration. The wired communication interface 501 may be a standard communication interface for control (such as DALI) and is used to connect the access point 200 to wired networks 106 through the wired communication link 206. The access point (200), not shown in the present illustration, allows the master controller (103), not shown in the present illustration, to control the wireless networks 105, through the wireless communications link (203), or to control the wired networks 106 through the wired communications link (206). The configuration adapter 204 is used to receive the configuration data, through the configuration link 207, downloaded from the commissioning tool (104), and not shown in the present illustration. The download may be carried out by contactless technologies (such as RFID/NFC) or by contact technologies (such as 1-Wire). The RF transceiver 205 may be used to connect to the wireless network (105) through the wireless communication link 203. The wireless network (105) may be implemented by a low-rate, low-power wireless standard protocol (such as ZigBee). The AP controller 600 coordinates the functioning of the device and may be implemented by a standard microcontroller.

Figure 7:
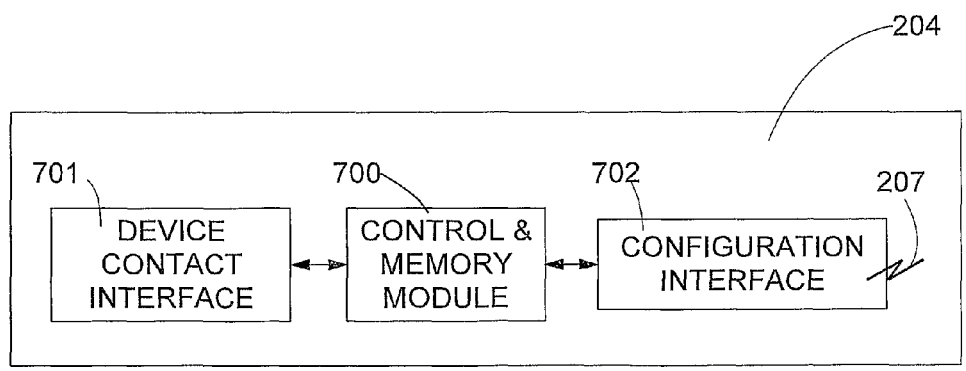
FIG. 7 is a schematic block diagram of a configuration adapter, according to the present invention.

FIG. 7 is a schematic block diagram of a configuration adapter 204, according to the present invention.

The configuration interface 702 is used to load the configuration data downloaded from the commissioning tool (104), not shown in the present illustration, through the configuration link 207.

The configuration adapter 204 may be differently implemented in hardware in the CT (commissioning tool), AP (access point) and in the wired and wireless devices, but the configuration interface 702 implements identical configuration link communication protocols (such as ISO 14443).

The data load may be carried out by contactless technologies (such as RFID/NFC) or by contact technologies (such as 1-Wire). The control and memory module 700 may be used to store the loaded configuration data and to control the adapter. The configuration adapter 204 in the wireless devices (202), wired devices (201) and access points (202) (not shown in the present illustration), may not necessarily be powered-up during the configuration data load. The configuration data may be read by the devices through the device contact interface 701. The device contact interface 701 may be a standard communication interface (such as SPI or 1-Wire) or a standard control interface (such as DALI).

Detailed Method Description

Architectural Design (No. A of Table 1)

A networks scheme of the system 102 to be installed may be defined, where each wireless and wired device has a (wired or wireless) logical ID that specifies its type and a physical location. The type of the device may be later used by the networks installers to install the correct type of device in the specified physical location.

Figure 8:
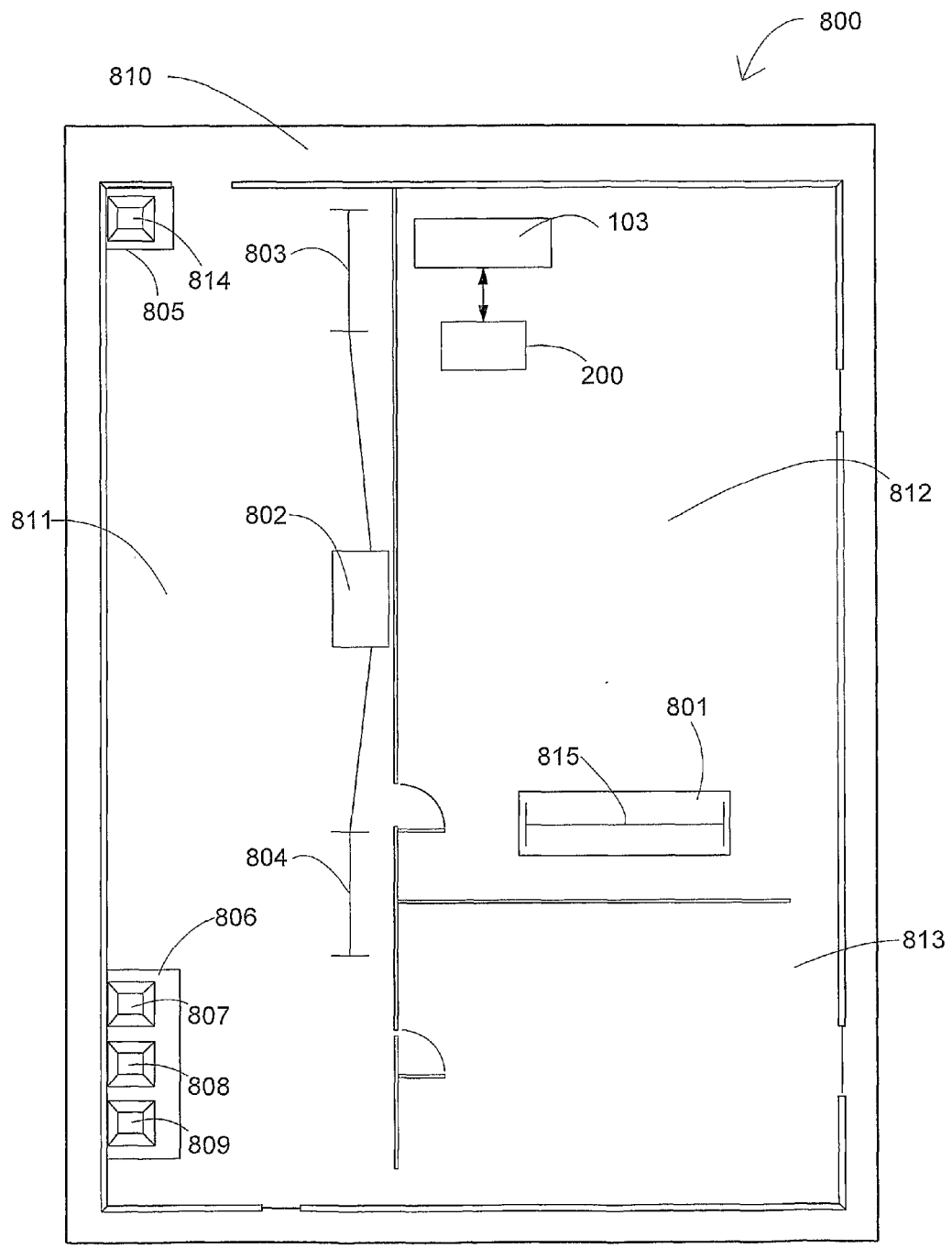
FIG. 8 is an example of a networks scheme, installed on a floor of a building, according to the present invention.

FIG. 8 is an example of a networks scheme 800, installed on a storey of a building, according to the present invention. The system includes the following components: master controller 103, access point 200, a wireless large fluorescent 801, a wireless standard device 802 connected to wired standard fluorescents in the left wing 803 and to wired standard fluorescents in the right wing 804, a wireless 1-gang switch 805 and a wireless 3-gang switch 806.

The networks scheme 800 is a map of the installation site, and the physical location for each device may be its coordinates on the map. In the example a physical location of the wireless 3-gang switch 806 may be [floor #2 810, hallway 811]. The physical location may contain additional parameters such as building number, wall or ceiling, etc. The type of the switch wireless device is wireless 3-gang switch 806. The pair (type, physical location) is referred to as wireless logical ID and uniquely identifies each device (i.e. no two devices have the same logical ID). In the example, the wireless logical ID for the device is (wireless 3-gang switch 806, [floor #2 810, hallway 811]). The type may further include more parameters such as manufacturer name, production date, version number, etc.

For wired devices 201, the device wired logical ID may be comprised of its wireless device's wireless logical ID and the wired devices own wired logical sub-ID. In the example, a wired logical ID of a wired device 201 may be: (wireless 3-gang switch, 806 [floor #2 810, hallway 811], left switch 807, [floor #2 810, hallway 811]). In this case the wired logical sub-ID of the switch is (left switch 807, [floor #2 810, hallway 811]).

Binding information may be defined. A binding is a unidirectional logical link between a source endpoint (which initiate an operation) and a destination endpoint (which is designated to perform the operation) that run the same application. Bindings allow connections between different devices running a similar application. For example a switch and ballast that run a home automation application. The binding information is a set of entries. Each entry contains a pair of wired logical IDs of the bound devices. A binding entry may also contain other data needed to bind the devices. This information may vary according to the communication protocol. An example of other data contained in each binding entry, (in case ZigBee is used as the communication protocol), is a list of cluster IDs. A cluster ID identifies a cluster and is associated with data flowing out of, or into the device. Cluster IDs are unique within the scope of a specific application. For example, a cluster may be associated with turning a device on/off in a home automation application.

An example of binding information entries is shown in Table 2.

TABLE 2

| Entry | Output Wired Logical ID | Input Wired Logical ID | Cluster IDs |
|---|---|---|---|
| 21 | (wireless 3-gang switch, [floor#2, hallway], right switch, [floor#2, hallway]) | (wireless large fluorescent, [floor#2, room#1], large fluorescent, [floor#2, room#1]) | ID1, ID2 |
| 22 | (wireless 3-gang switch, [floor#2, hallway], middle switch, [floor#2, hallway]) | (wireless standard device, [floor#2, hallway], wired standard fluorescent, [floor#2, hallway, right wing]) | ID1, ID2 |
| 23 | (wireless 3-gang switch, [floor#2 hallway], left switch, [floor#2, hallway]) | (wireless standard device, [floor#2, hallway], wired standard fluorescent, [floor#2, hallway, left wing]) | ID1, ID2 |
| 24 | (wireless 1-gang switch, [floor#2, hallway], single switch, [floor#2, hallway]) | (wireless standard device, [floor#2, room#1], large fluorescent, [floor#2, room#1]) | ID1, ID2 |
| 25 | (wireless 1-gang switch, [floor#2, hallway], single switch, [floor#2, hallway]) | (wireless standard device, [floor#2, hallway], wired standard fluorescent, [floor#2, hallway, right wing]) | ID1, ID2 |
| 26 | (wireless 1-gang switch, [floor#2, hallway], single switch, [floor#2, hallway]) | (wireless standard device, [floor#2, hallway], wired standard fluorescent, [floor#2, hallway, left wing]) | ID1, ID2 |

In the example of Table 2, which refers to the example networks scheme shown in FIG. 8, the right switch 809 is bound to the large fluorescent 815 in room #1 812, the middle switch 808 is bound to the wired standard fluorescent in the right wing 804 of the hallway 811, the left switch 807 is bound to the wired standard fluorescent in the left wing 803 of the hallway 811, and the single switch 814 is bound to the large fluorescent 815 in room #1 812, to the wired standard fluorescent in the right wing 804 of the hallway 811 and to the wired standard fluorescent in the left wing 803 of the hallway 811.

The binding information is organized in the table as follows: Entry 21 contains the wired logical ID of the right switch device 809 (comprised of the wireless device's wireless logical ID and its own wired logical sub-ID within the context of the wireless device, wireless 3-gang switch 806), and the wired logical ID of the large fluorescent 815 in room #1 812. Entry 22 contains the wired logical ID of the middle switch device 808, and the wired logical ID of the wired standard fluorescent 804 in the right wing of the hallway 811. Entry 23 contains the wired logical ID of the left switch device 807, and the wired logical ID of the wired standard fluorescent 803 in the left wing of the hallway 811.

Entry 24 contains the wired logical ID of the single switch device 814 (comprised of the wireless device's wireless logical ID and its own wired logical sub-ID within the context of the wireless device, wireless 1-gang switch—805), and the wired logical ID of the large fluorescent 815 in room #1 812. Entry 25 contains the wired logical ID of the same single switch device 814, and the wired logical ID of the wired standard fluorescent in the right wing 804 of the hallway 811. Entry 26 contains the wired logical ID of the single switch device 814, and the wired logical ID of the wired standard fluorescent in the left wing 803 of the hallway 811.

In this example (where ZigBee is used as the communication protocol and the devices are running a home automation application), each entry also contains a list of cluster IDs associated with lighting control (last column in the Table 2).

An illustration of a wired devices mapping table is shown in Table 3.

TABLE 3

| Entry | Wired Logical ID | Wired Communication Link Address |
|---|---|---|
| 31 | (wireless 3-gang switch, [floor#2, hallway], right switch, [floor#2, hallway]) | 11 |
| 32 | (wireless 3-gang switch, [floor#2 hallway], middle switch, [floor#2, hallway]) | 12 |
| 33 | (wireless 3-gang switch, [floor#2, hallway], left switch, [floor#2, hallway]) | 13 |
| 34 | (wireless standard device, [floor#2, hallway], wired standard fluorescent, [floor#2, hallway, right wing]) | 11 |
| 35 | (wireless standard device, [floor#2, hallway], wired standard fluorescent, [floor#2, hallway, left wing]) | 12 |
| 36 | (wireless 1-gang switch, [floor#2, hallway], single switch, [floor#2, hallway]) | 34 |
| 37 | (wireless large fluorescent, [floor#2, room#1], large fluorescent, [floor#2, room#1]) | 46 |

Electrical Design (No. B of Table 1)

A wired device mapping may be created for the wired devices 201. For example, Table 3 illustrates the wired devices' mapping table for the example control system scheme shown in FIG. 8, according to the method of the present invention. For each wired device 201 on the networks scheme of FIG. 8, the wired device 201 mapping maps the wired logical ID of the wired device 201 to its wired communication link 206 address used by the implemented wired communication protocol. The wired communication link 206 address for each wired device 201 may be automatically allocated by the master controller 103, (stage 902 of the process of defining the wired device mapping, according to a method of the present invention, shown as a flowchart in FIG. 9).

This address may be later loaded into or accessed by the commissioning tool 104 and downloaded into the wired device 201. The entry 31 of the wired devices mapping (Table 3) specifies that the right switch 809 (in the hallway 811 of floor #2 810) that is connected to the wireless 3-gang switch 806 (in the hallway 811 of floor #2 810) has an address of 11 (arbitrary number) in the wireless 3-gang switch 806 wired communication link, not shown in this example. The entry 32 of the wired devices mapping table example of table 3 specifies that the middle switch 808 (in the hallway 811 of floor #2 810) that is connected to the wireless 3-gang switch 806 (in the hallway 811 of floor #2 810) has an address of 12 (arbitrary number) in the wireless 3-gang switch 806 wired communication link, not shown in this example. The entry 33 of the wired devices mapping table example (Table 3) specifies that the left switch 807 (in the hallway 811 of floor #2 810) that is connected to the wireless 3-gang switch 806 (in the hallway 811 of floor #2 810) has an address of 13 (arbitrary number) in the wireless 3-gang switch 806 wired communication link, not shown in this example. The entry 34 of the wired devices mapping table example (Table 3) specifies that the wired standard fluorescent in the right wing 804 (in the hallway 811 of floor #2 810) that is connected to the wireless standard device 802 (in the hallway 811 of floor #2 810) has an address of 11 (arbitrary number) in the standard fluorescent wired communication link. The entry 35 of the wired devices mapping table example (Table 3) specifies that the wired standard fluorescent in the left wing 803 (in the hallway 811 of floor #2 810) that is connected to the wireless standard device 802 (in the hallway 811 of floor #2 810) has an address of 12 (arbitrary number) in the standard fluorescent wired communication link (not shown in this example). The entry 36 of the wired devices 201 mapping table example (Table 3) specifies that the single switch 814 (in the hallway 811 of floor #2 810) that is connected to the wireless 1-gang switch 805 (in the hallway 811 of floor #2 810) has an address of 34 (arbitrary number) in the single switch 814 wired communication link, not shown in this example. The entry 37 of the wired devices mapping table example (Table 3) specifies that the large fluorescent 815 (in the room #1 812 of floor #2 810) that is connected to the wireless large fluorescent 801 (in the room #1 812 of floor #2 810) has an address of 46 (arbitrary number) in the large fluorescent wired communication link, not shown in this example.

Figure 9:
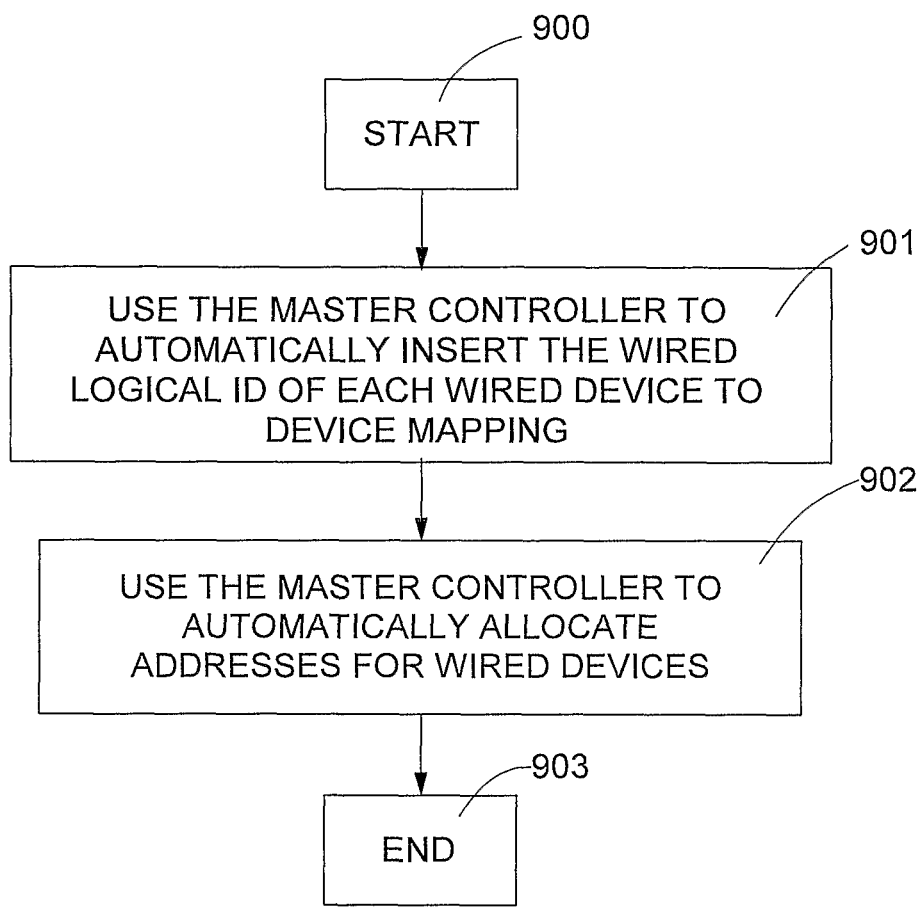
FIG. 9 is a flow chart of a process of defining the wired device mapping, according to a method of the present invention.

FIG. 9 is a flowchart of a process of defining the wired device mapping, according to a method of the present invention.

The process of defining the wired device mapping including the sub-stages of:

- starting the process of defining the wired device mapping 900;
- using the master controller to automatically insert the wired logical ID of each wired device to wired device mapping 901;
- using the master controller to automatically allocate addresses for wired devices 902; and
- ending the process of defining the wired device mapping 903.

Figure 10:
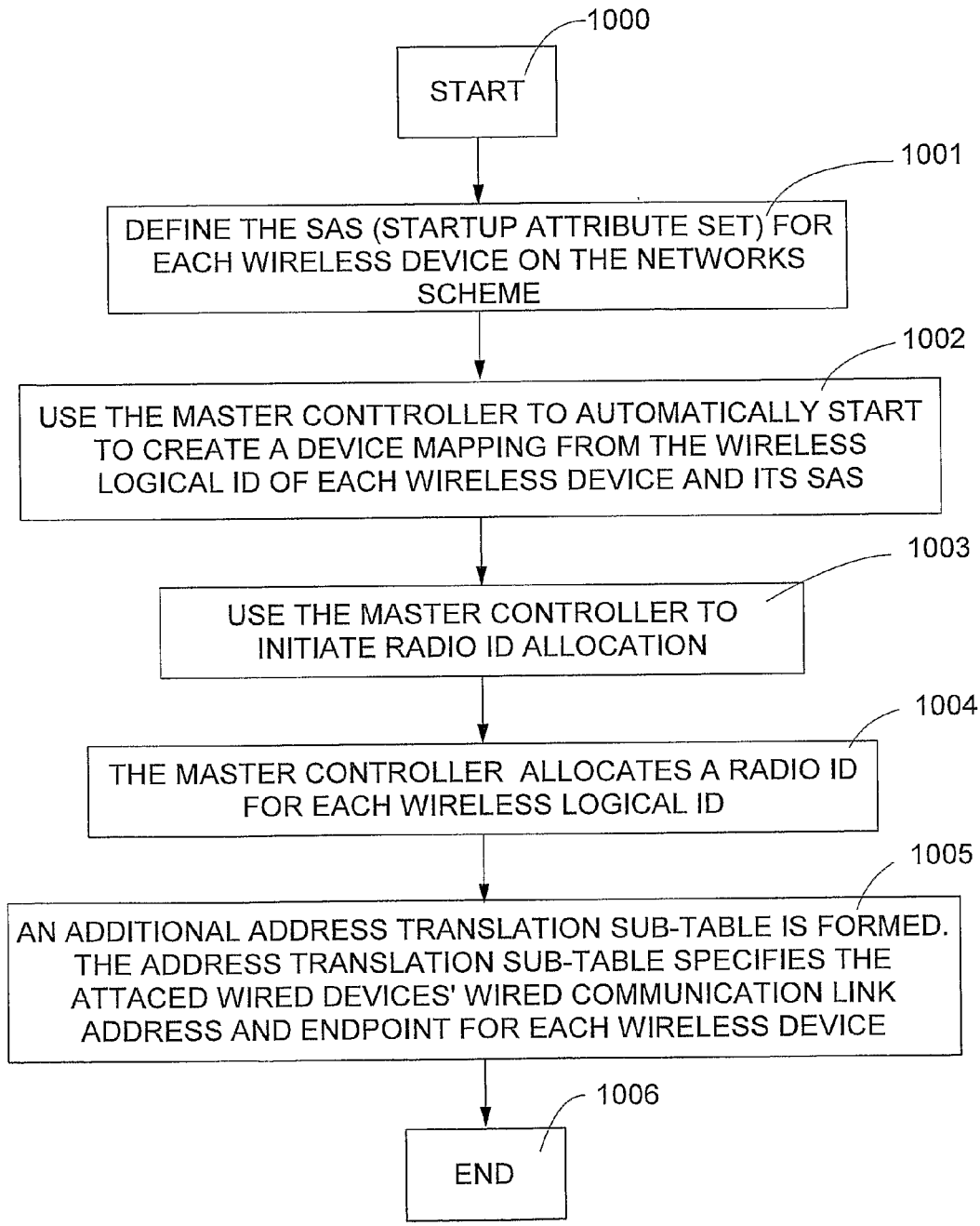
FIG. 10 is a flowchart of a process of defining the wireless device mapping, according to a method of the present invention.

FIG. 10 is a flowchart of a process of defining the wireless device mapping, according to a method of the present invention.

A wireless device mapping is created for wireless devices. For each wireless device (202) on the networks scheme, the wireless device mapping maps the wireless logical ID of the device to a unique radio ID (wireless communication link address) and startup attribute set (SAS).

The SAS of a wireless device is a set of attributes that determines the initial behavior of the device. Such a set may include:

- Startup parameters which determine how the device should join a network.
- The PAN (personal area network) ID of the network.
- The channel mask which determines the channels that the device should scan to find a network to join.
- Security data e.g. network key.
- Additional parameters (such as operation mode).

The SAS for each wireless device may be defined, (stage 1001), after a study at the installation site to determine desired parameters (e.g. available PAN IDs, available channels).

The unique radio ID, (stage 1004), for each wireless device is automatically defined by the master controller (103).

The process of defining the wireless device mapping including the stages of:

- starting the process of defining the wireless device mapping 1000;
- defining the SAS for each wireless device on the networks scheme 1001;
- using the master controller to start creating a device mapping from the wireless logical ID of each wireless device and its SAS 1002;
- using the master controller to initiate radio ID allocation 1003;
- using the master controller to allocate radio ID for each wireless logical ID 1004;
- forming an additional address translation sub-table which specifies, for each wireless device, the attached wired devices' wired communication link address and endpoint 1005; and ending the process of defining the wireless device mapping 1006.

An illustration of a wireless devices mapping table is shown in Table 4.

The address translation sub-table (in Table 4), of the wireless device mapping (Table 4) translates endpoint identifiers (used in the implemented wireless protocol) of wired devices, attached to each wireless device, to their wired communica-

TABLE 4

| Wireless Logical ID | Radio ID (Wireless communication link address) | SAS (Startup Attribute Set) | | | | | Address Translation Sub-Table | | | |
|---|---|---|---|---|---|---|---|---|---|---|
| | | Join Mode | PAN ID | Channel Mask | Network Key | Max End-Devices | Wired Logical Sub-ID | Wired communication link address | End-point | Entry |
| (Access Point, [Floor#2, Room#1]) A | 16 | Coordinator | 2 | 0x18 | 0x4278 | 6 | — | | | 41 |
| (Wireless 3-gang switch, [Floor#2, Hallway]) B | 13 | End-Device | 2 | 0x18 | 0x4278 | — | (Right Switch, [Floor#2, Hallway]) | 11 | 1 | 42 |
| | | | | | | | (Middle Switch, [Floor#2, Hallway]) | 12 | 2 | 43 |
| | | | | | | | (Left Switch, [Floor#2, Hallway]) | 13 | 3 | 44 |
| (Wireless Standard Device, [Floor#2, Hallway]) C | 24 | Router | 2 | 0x18 | 0x4278 | 4 | (Wired Standard Fluorescent, [Floor#2, Hallway, Right Wing]) | 11 | 1 | 45 |
| | | | | | | | (Wired Standard Fluorescent, [Floor#2, Hallway, Left Wing]) | 12 | 2 | 46 |
| (Wireless Large Fluorescent, [Floor#2, Room#1]) D | 25 | Router | 2 | 0x18 | 0x4278 | 4 | (Large Fluorescent, [Floor#2, Room#1]) | 46 | 5 | 47 |
| (Wireless 1-gang switch, [Floor#2, Hallway]) E | 18 | End-Device | 2 | 0x18 | 0x4278 | — | (Single Switch, [Floor#2, Hallway]) | 34 | 4 | 48 |

The entry (A) of the wireless device mapping table example (Table 4) specifies that the access point device (200) (in the room #1 (812) of floor #2 (810)) is assigned a radio ID (wireless communication link address) of 16 (arbitrary number), and is also assigned a startup attribute set (SAS) which includes its join mode (as a coordinator) and other startup attributes.

The second entry (B) of the wireless device mapping table example (Table 4) specifies that the wireless 3-gang switch (806) (in the hallway (811) of floor #2 (810)) is assigned a radio ID of 13 (arbitrary number), and is also assigned a startup attribute set (SAS) which includes its join mode (as an end device) and other startup attributes.

Figure 11:
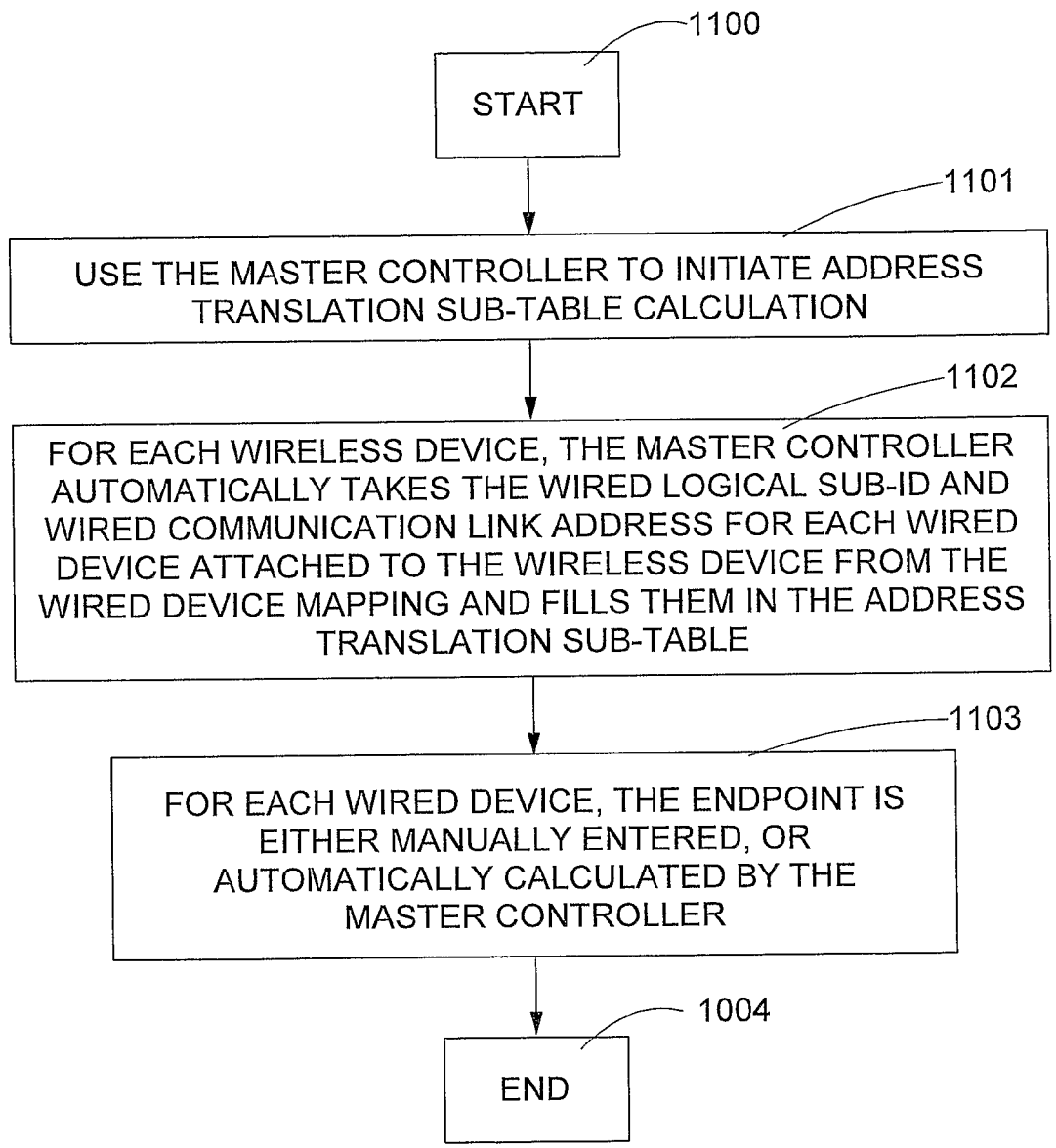
FIG. 11 is a flowchart of a process of defining an address translation table for wireless devices, according to a method of the present invention.

FIG. 11 is a flowchart of a process of defining an address translation sub-table for a wireless device (202), according to a method of the present invention.

The process of defining an address translation sub-table for wireless devices including the stages of:
  starting the process of defining an address translation sub-table for wireless devices 1100;
  using the master controller to initiate address translation sub-table calculation 1101;
  using the master controller to automatically take for each wireless device, the wired logical sub-ID and wired communication link address for each wired device attached to the wireless device from the wired device mapping and fill them in the address translation sub-table 1102;
  entering for each wired device its endpoint manually, or automatically after calculating it by the master controller 1103; and
  ending the process of defining an address translation sub-table for wireless devices 1104.

tion link address used by the implemented wired communication protocol. The address translation sub-table (in Table 4) allows the wireless device (202) to address wired devices 201 in the wired network (105).

The wired logical sub-ID and wired communication link address parameter of each wired device (201) in the address translation sub-table (in Table 4) is calculated by the master controller (103), by reading the wired logical IDs and wired communication link addresses of attached wired devices from the wired device mapping 1102.

The endpoint parameter of each wired device in the address translation sub-table (in Table 4) may be either manually entered or automatically calculated by the master controller 1103.

In the example of Table 4, consider the three entries of the address translation sub-table that correspond to the second entry (B) of the wireless device mapping table example (entries 42, 43, 44). These address translation sub-table entries contain the address translation data of the wired devices attached to the wireless 3-gang switch (806) in the hallway (811) of floor #2 810. The first entry (entry 42), specifies that the wired right switch device (809) connected to the wireless 3-gang switch (806) is assigned an endpoint of 1 (arbitrary number) and a wired communication link address of 11 (as specified in entry 31 of the wired device mapping in Table 3). The second entry, (entry 43), specifies that the middle switch (808) is assigned an endpoint of 2 (arbitrary number) and a wired communication link address of 12 (as specified in entry 32 of the wired device mapping in Table 3). The third entry (entry 44), specifies that the left switch 807 is assigned an endpoint of 3 (arbitrary number) and a wired communication link address of 13 (as specified in entry 33 of the wired device mapping in Table 3).

The entry (C) of the wireless device mapping table example (Table 4) specifies that the wireless standard device (802) (in the hallway (811) of floor #2 (810)) is assigned a radio ID of 24 (arbitrary number), and is also assigned a startup attribute set (SAS) which includes its join mode (as a router) and other startup attributes.

Consider the two entries of the address translation sub-table that correspond to the entry (C) of the wireless device mapping table example (entries 45, 46). These address translation sub-table entries contain the address translation data of the wired devices attached to the wireless standard device (802) in the hallway (811) of floor #2 810. The first entry (entry 45), specifies that the wired standard fluorescent in the right wing device (804) connected to the wireless standard device (802) is assigned an endpoint of 1 (arbitrary number) and a wired communication link address of 11 (as specified in entry 34 of the wired device mapping in Table 3). The second entry (entry 46), specifies that the wired standard fluorescent in the left wing (803) is assigned an endpoint of 2 (arbitrary number) and a wired communication link address of 12 (as specified in entry 35 of the wired device mapping in Table 3).

The entry (D) of the wireless device mapping table example (Table 4) specifies that the wireless large fluorescent (801) (in the room #1 (812) of floor #2 (810)) is assigned a radio ID of 25 (arbitrary number), and is also assigned a startup attribute set (SAS) which includes its join mode (as a router) and other startup attributes.

Consider the entry of the address translation sub-table that corresponds to entry (D) of the wireless device mapping table example (entry 47). This entry specifies that the large fluorescent device (815) in the room #1 (812) of floor #2 (810), (connected to the wireless large fluorescent device (801), is assigned an endpoint of 5 (arbitrary number) and a wired communication link address of 46 (as specified in entry 37 of the wired device mapping in Table 3).

The entry (E) of the wireless device mapping table example (Table 4) specifies that the wireless 1-gang switch (805) (in the hallway (811) of floor #2 (810)) is assigned a radio ID of 18 (arbitrary number), and is also assigned a startup attribute set (SAS) which includes its join mode (as an end-device) and other startup attributes.

Consider the entry of the address translation sub-table that corresponds to entry (E) of the wireless device mapping table example (entry 48). This entry specifies that the single switch device (814) in the hallway (811) of floor #2 (810), (connected to the wireless 1-gang switch device (805), is assigned an endpoint of 4 (arbitrary number) and a wired communication link address of 34 (as specified in entry 36 of the wired device mapping in Table 3).

The master controller (103) has access to the device mappings. Access may either be local (e.g. CD), or remote access (e.g. a remote database (301)).

Networks Installation (Item C of Table 1)

In this stage the wireless devices and wired devices are installed.

Figure 12:
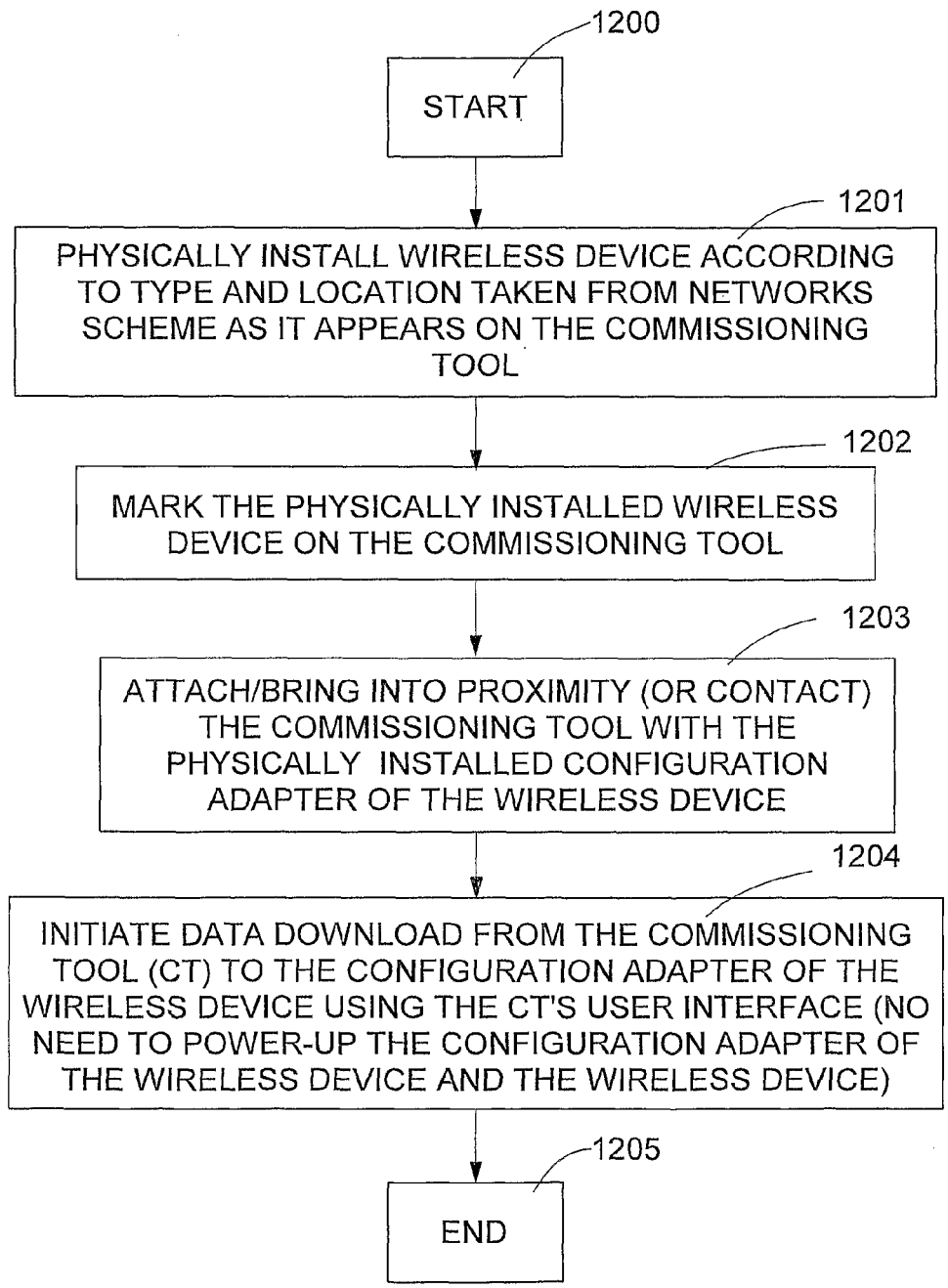
FIG. 12 is a flowchart of a process of wireless device installation, according to a method of the present invention.

FIG. 12 is a flowchart of a process of wireless device (202) installation, according to a method of the present invention.

The process of defining a wireless device installation including the stages of:
  starting the process of defining a wireless device installation 1200;
  physically installing a wireless device (202) according to type and location taken from the networks scheme as it appears on the commissioning tool 1201;
  marking the physically installed wireless device (202) on the commissioning tool 1202;
  attaching/bringing into proximity (or contact) the commissioning tool with the physically installed configuration adapter of wireless device 1203;
  initiating data download from the commissioning tool to the configuration adapter 204 of the wireless device using the tool's user interface (no need to power-up the configuration adapter 204 of the wireless device and the wireless device) 1204; and
  ending the process of defining a wireless device installation 1205.

The commissioning tool (104) is attached or brought into proximity or contact with the configuration adapter 204 of wireless device (202), (stage 1203). Configuration data taken from the wireless device mapping is downloaded from the commissioning tool into the configuration adapter 204 of wireless device (202), (stage 1204). For each wireless device, the configuration data includes its radio ID, SAS (Startup Attribute Set) and its address translation sub-table entries.

The configuration data may also include the binding information if the memory size in the configuration adapter is large enough. The order of the stages 1203/1204 and 1201 can be interchanged for the convenience of the installer.

Figure 13:
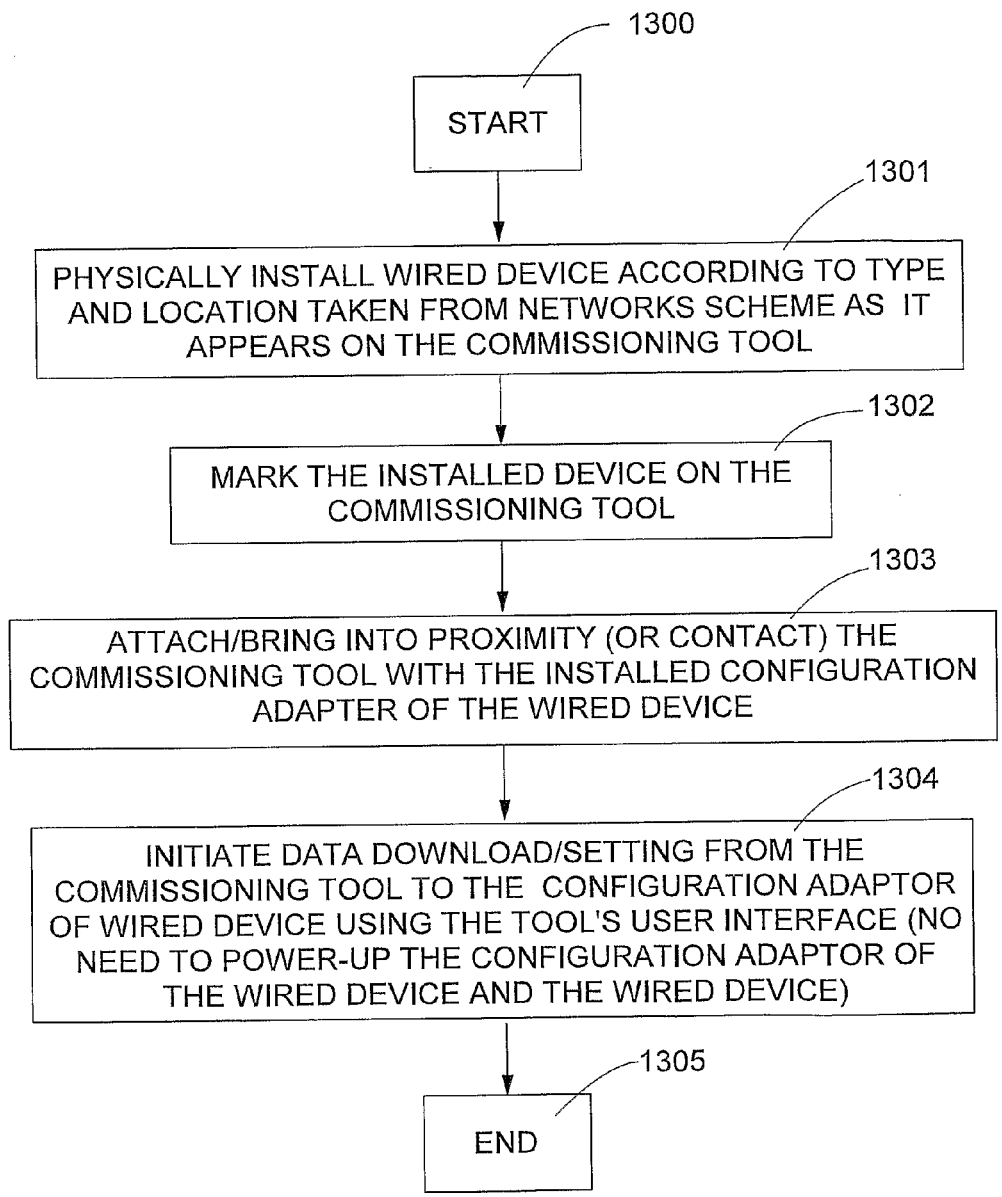
FIG. 13 is a flowchart of a process of wired device installation, according to a method of the present invention.

FIG. 13 is a flowchart of a process of wired device (201) installation, according to a method of the present invention.

The process of defining a wired device (201) installation including the stages of:
  starting the process of defining a wired device installation 1300;
  physically installing a wired device according to type and location taken from the networks scheme as it appears on the commissioning tool (104) 1301;
  marking the physically installed wired device on the commissioning tool (104) 1302;
  attaching/bringing into proximity (or contact) the commissioning tool (104) with the physically installed configuration adapter 204 of the wired device (201) 1303;
  initiating data download from the commissioning tool (104) to the configuration adapter 204 of the wired device (201) using the tool's user interface (no need to power-up the configuration adapter 204 of the wired device and the wired device) 1304; and
  ending the process of defining a wired device installation 1305.

For the wired devices (201), the configuration data taken from the wired device mapping that was downloaded to the commissioning tool (104) includes the wired communication link address of each wired device. This data is downloaded into the configuration adapter 204 of wired devices (202).

The order of the stages 1303/1304 and 1301 can be interchanged for the convenience of the installer.

The configuration adapter 204 of wireless devices (201) and the wired devices (202) don't need to be powered up during this stage.

Networks Initialization (Item D of Table 1)

The wireless devices (202) and wired devices (201) may be powered up and automatically initialize themselves.

Figure 14:
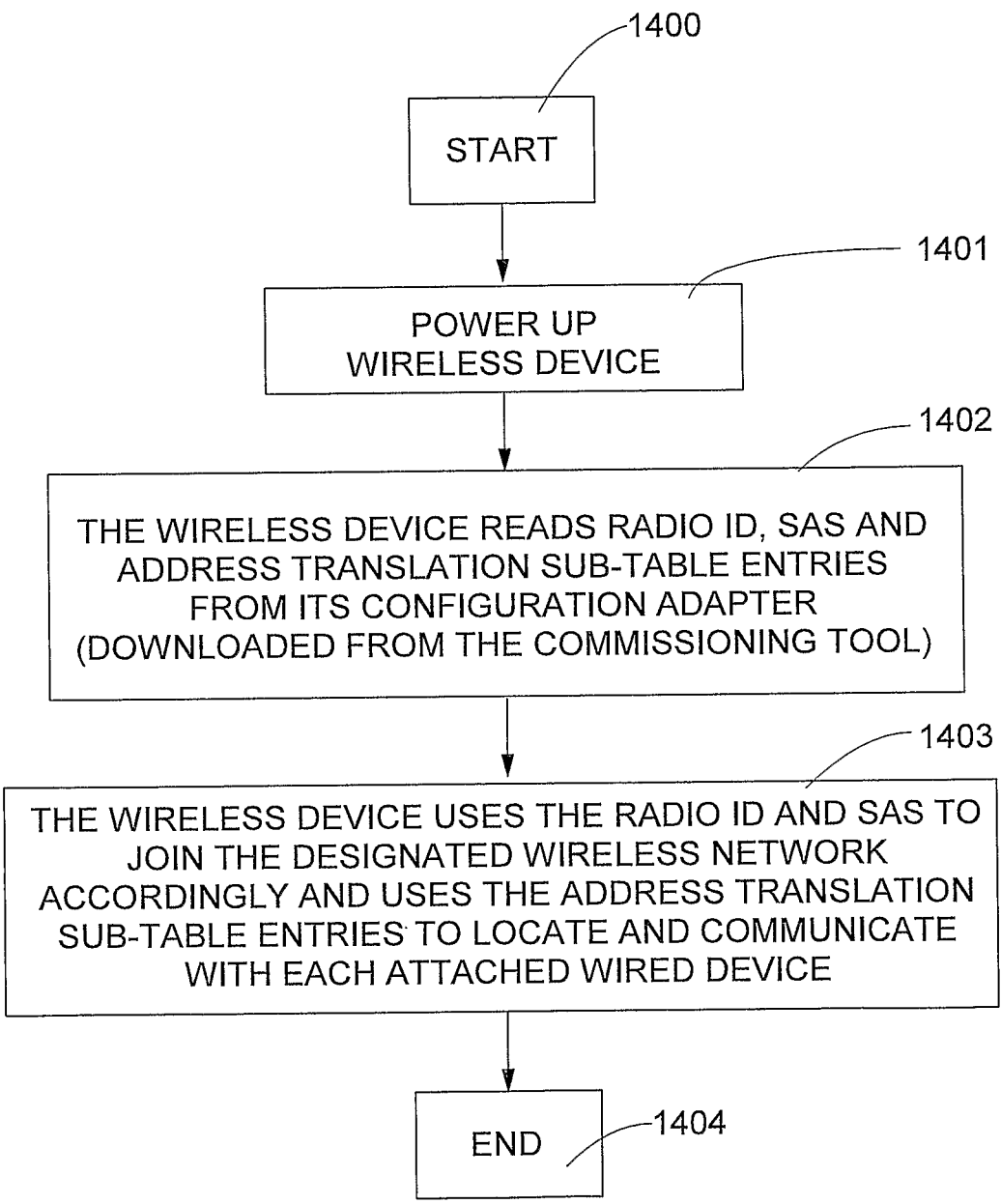
FIG. 14 is a flowchart of a process of wireless device initialization, according to a method of the present invention.

FIG. 14 is a flowchart of a process of wireless device (202) initialization, according to a method of the present invention.

The process of defining wireless device initialization including the stages of:
  starting the process of defining wireless device initialization 1400;
  powering up wireless device (202) 1401;
  reading the radio ID, SAS and address translation sub-table entries (downloaded from the commissioning tool (104)) from the configuration adapter 204 of the wireless device (202) 1402;

using the radio ID and SAS to join the designated wireless network accordingly, and using the address translation sub-table entries to locate and communicate with each attached wired device 1403; and ending the process of defining wireless device initialization 1404.

After a wireless device 202 is powered-up, it initializes itself. Each wireless device (202) reads, from its configuration adapter 204, the information downloaded by the commissioning tool 104 (stage 1402), and uses the radio ID and SAS to join the wireless network according to the join mode (Table 4) either as a coordinator responsible for starting and maintaining the network, or as a specific device (router or end device), and uses its address translation sub-table entries to locate and communicate with each attached wired device (stage 1403).

Figure 15:
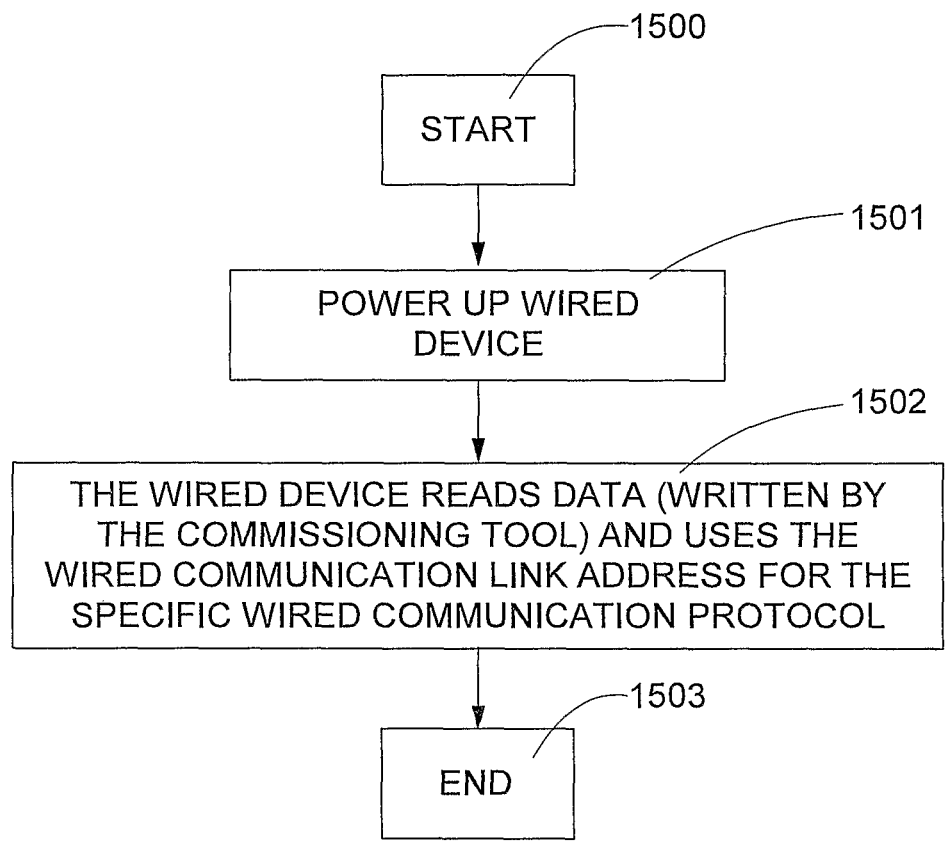
FIG. 15 is a flowchart of a process of wired device initialization, according to a method of the present invention.

FIG. 15 is a flowchart of a process of wired device (201) initialization, according to a method of the present invention.

The process of defining wired device (201) initialization including the stages of starting the process of defining wired device (201) initialization 1500;

powering up wired device (201) 1501;

reading the data (downloaded from the commissioning tool (104)) from the configuration adapter 204 of wired device (201) and using the wired communication link address for the specific wired communication protocol 1502; and ending the process of defining wired device initialization 1503.

After a wired device (201) is powered-up, it initializes itself. Each wired device (201) reads from the configuration adapter (204) the information downloaded by the commissioning tool (104). The information may be used by the wired device (201) to initialize its wired communication link address for the specific wired communication protocol, (stage 1502).

Bindings Formation (Item E of Table 1)

Figure 16:
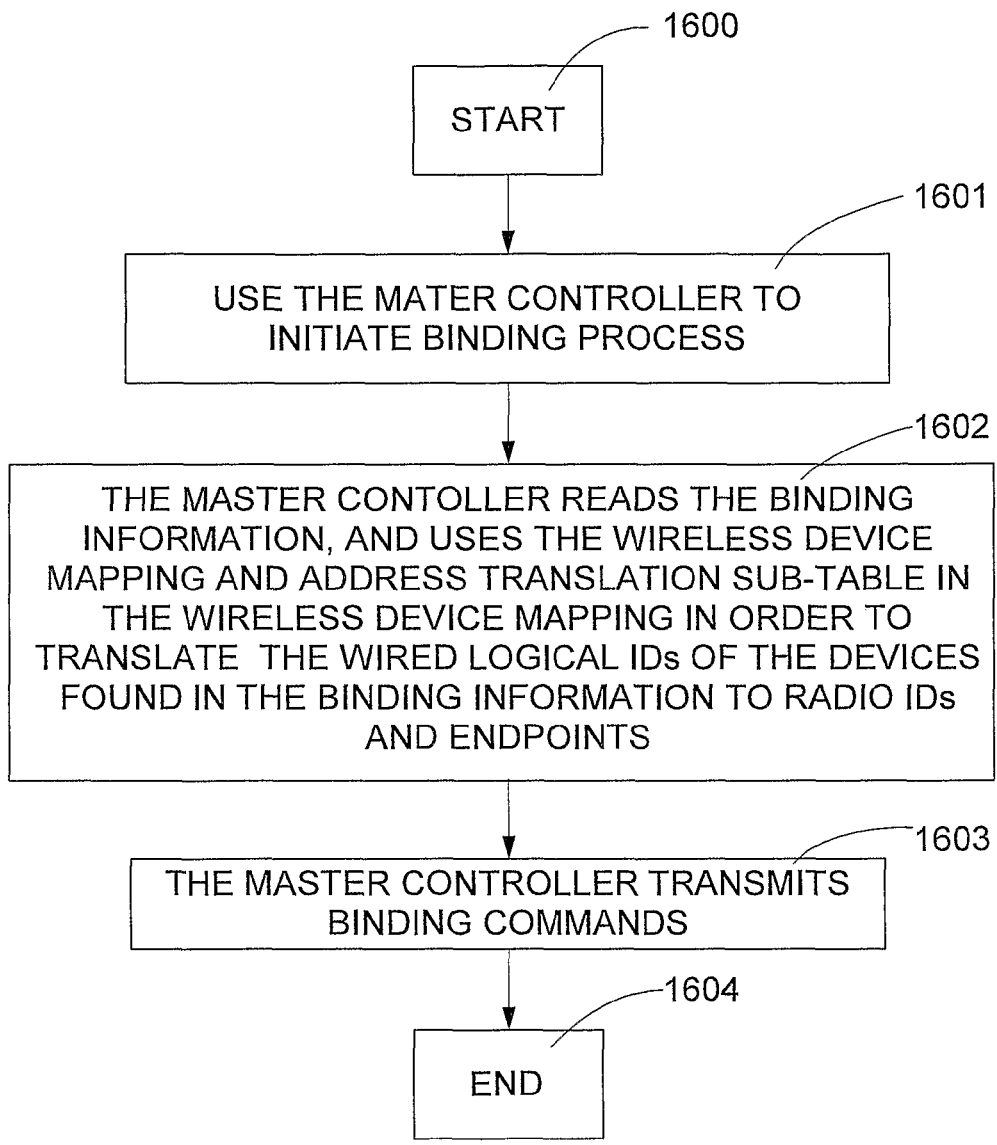
FIG. 16 is a flowchart of a process of bindings formation, according to a method of the present invention.

FIG. 16 is a flowchart of a process of bindings formation, according to a method of the present invention.

The process of defining bindings formation includes the stages of starting the process of defining bindings formation 1600;

using the master controller to initiate binding process 1601;

reading the binding information by the master controller (103), and using the address translation sub-table in the wireless device mapping in order to translate the wired logical IDs of the devices found in the binding information to radio IDs and endpoints 1602;

transmitting binding commands by the master controller 1603; and ending the process of defining bindings formation 1604.

Binding links are formed. The master controller (103) reads the binding information from the database (301), and uses the wireless device mapping and address translation sub-table in the wireless device mapping (Table 4) in order to translate the wired logical IDs of the devices found in the binding information to radio IDs and endpoints, (stage 1602). After the translation, the master controller (103) sends binding commands. The binding commands contain the radio IDs of the bound wireless devices (202), their endpoints, and the other binding information that may exist in the binding Table 4 (e.g. a list of cluster IDs).

Attaching Devices to the System after the Networks Formation

The method of attaching a device to the control system (102) after the networks formation is similar to the initial method. The wireless (202) or wired device (201) is first added to the networks scheme and registered with all the required parameters (such as type, physical location and binding). The device is inserted to the relevant device mapping table and to the binding table (Table 2), if necessary (for wired devices). The configuration data from the commissioning tool is loaded into the configuration adapter (204) of the device, wireless device (202) or wired device (201) is physically installed in the designated location, and the master controller (103) sends binding commands, if necessary (for wired devices), using the updated binding table.

Figure 17:
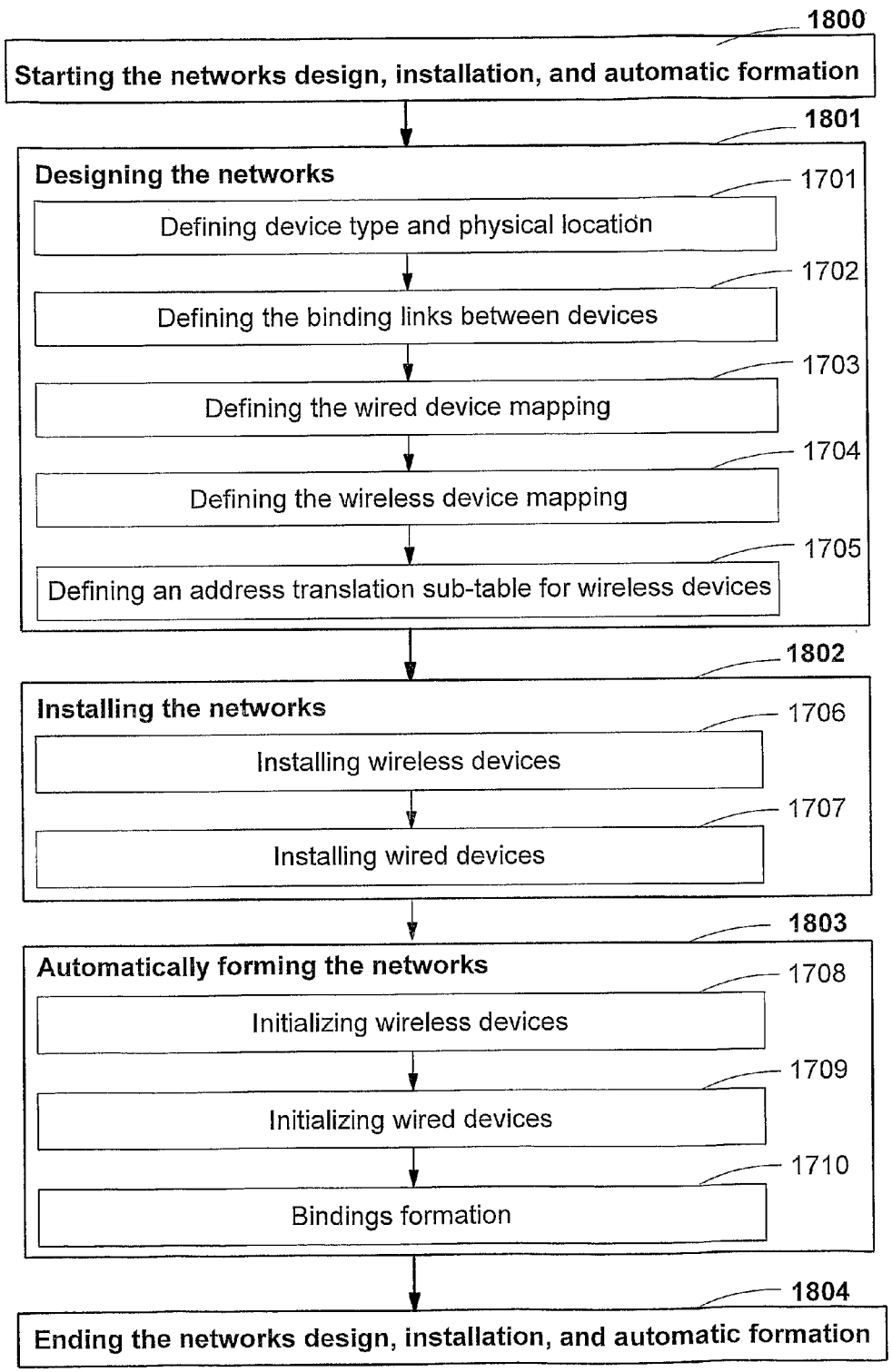
FIG. 17 is a flowchart of a process of networks design, installation and automatic formation, according to a method of the present invention.

FIG. 17 is a flowchart of a method of networks design, installation and formation, according to the present invention.

The method of networks design, installation and formation comprises the main stages of:

starting the networks design, installation and formation 1800;

designing the networks 1801;

installing the networks 1802;

forming the networks 1803; and ending the networks design, installation and formation 1804.

The main stage of starting the networks design, installation and formation 1800, can comprise the stage of:

providing a design system.

The main stage of designing the networks 1801 comprises the stages of:

defining device type and physical location 1701;

defining the binding links between devices 1702;

defining the wired device mapping 1703, the stage is described in FIG. 9;

defining the wireless device mapping 1704, the stage is described in FIG. 10; and defining an address translation sub-table for a wireless device 1705.

This stage is described in FIG. 11.

The main stage of installation of the networks 1802 comprises the stages of:

installing wireless devices 1706, this stage is described in FIG. 12;

installing wired devices 1707, this stage is described in FIG. 13;

The main stage of forming the networks 1803 comprises the stages of:

initializing wireless devices 1708, this stage is described in FIG. 14;

initializing wired devices 1709, this stage is described in FIG. 15; and bindings formation 1710, this stage is described in FIG. 16.

While the invention has been described with respect to a limited number of embodiments, it will be appreciated that many variations, modifications and other applications of the invention may be made.

What is claimed is:

1. A method of design, installation, and formation, of a network that comprises wired and wireless devices and wired and wireless links, the method comprising the stages of:

creating a design of said network, said design comprising parameters and design configuration data of devices designed to be in said network and binding information defining bindings to allow connection between devices to run an application;

installing said devices according to said created design by accessing said created design by a commissioning tool and downloading data from said commissioning tool into a configuration adapter comprised in said devices before the devices are initialized; and forming said network and bindings according to said created design by initializing said devices and by reading said downloaded data from the configuration adapter once the devices are initialized; and wherein said commissioning tool comprises a configuration adapter for a complementary configuration link, wherein of the configuration adapters included in the system, only said configuration adapter of said commissioning tool must be powered-up during data communication between said at least one commissioning tool and said devices.

2. The method of claim 1, wherein said forming said network is done automatically once the devices are initialized.

3. The method of claim 1, further comprising after creating said design, storing said design of network in a design system.

4. The method of claim 1, wherein said creating a design of said network includes:
defining wired devices and wireless devices;
defining bindings between said wired devices;
defining a wired device mapping that maps a wired device to a wired network address; and
calculating an address translation sub-table of a wireless device, said calculation initiated by a master controller, and defining wireless device mapping that maps wireless logical identifier of a wireless device to its radio ID, start-up attribute set and address translation sub-table entries.

5. The method of claim 1, wherein said forming said network includes accessing data created in said creating a design of said network, by a master controller through a standard communication link.

6. The method of claim 1, wherein said installing said devices includes accessing data created in said creating a design of said network, by a commissioning tool through a standard communication link.

7. The method of claim 1, wherein said forming said network includes:
initializing at least one wireless device; and
initializing at least one wired device.

8. The method of claim 7, wherein initializing at least one wireless device includes:
powering up the at least one wireless device;
reading an ID, which is downloaded from a commissioning tool into a configuration adapter of said at least one wireless device,
reading address translation sub-table entries, and using said entries to locate and communicate with each attached wired device, thus providing an indirect communication link between wireless and wired devices in said network; and,
reading a startup attribute set, which is downloaded from said commissioning tool into said configuration adapter of said wireless device, and using said startup attribute set and said ID as a radio ID to join said network.

9. The method of claim 7, wherein initializing at least one wired device includes:
powering up the at least one wired device; and
reading data, which is downloaded from a commissioning tool into a configuration adapter of said wired device, and using a communication address for a specific wired communication protocol.

10. The method of claim 1, wherein forming said network and bindings includes:
reading said binding information by a master controller and using a wireless device mapping, which maps wireless logical identifier of a wireless device to its radio ID, start-up attribute set and address translation sub-table entries, and an address translation sub-table in of the wireless device in order to translate wired logical IDs of wired devices attached to said wireless device to radio IDs and endpoints, said logical IDs included in said binding information; and
transmitting commands to said wireless device by said master controller to form the bindings based on said radio IDs and endpoints.

11. The method of claim 1, wherein forming said network and bindings includes:
reading said binding information by said master controller and using a wireless device mapping, which maps wireless logical identifier of a wireless device to its radio ID, start-up attribute set and address translation sub-table entries, and an address translation sub-table of the wireless device in order to translate wired logical IDs of wired devices attached to said wireless device to radio IDs and endpoints, said logical IDs included in said binding information; and
downloading said translation and binding information from a commissioning tool into a configuration adapter of said wired device, and using said binding information and translation to form the bindings based on said radio IDs and endpoints.

12. The method of claim 4, wherein said defining a wired device mapping includes:
automatically inserting by said master controller a wired logical ID of a wired device to said wired device mapping; and
automatically allocating by said master controller an address for said wired device.

13. The method of claim 4, wherein said defining a wireless device mapping includes:
defining a startup attribute set for each of said wireless devices on a network scheme;
automatically creating by said master controller said wireless device mapping from wireless logical IDs and start-up attribute sets of each of said wireless devices;
allocating by said master controller a radio ID for each of said wireless logical IDs; and
forming an additional address translation sub-table which specifies wired communication link address and an endpoint for each of said wired devices attached to each one of said wireless devices.

14. The method of claim 4, wherein said calculating an address translation sub-table includes:
automatically taking by said master controller a wired logical sub-ID and wired communication link address for each wired device attached to a wireless device from said wired device mapping and fill it in said address translation sub-table; and
automatically calculating by said master controller endpoint identifiers of said attached wired devices.

15. The method of claim 1, wherein said installing comprises installation of at least one wireless device includes:
physically installing the at least one wireless device according to type and location taken from said design of said network accessed by said commissioning tool;
marking said physically installed at least one wireless device on said commissioning tool; and downloading data from said commissioning tool to a configuration adapter comprised in a wireless device using a user interface comprised in said commissioning tool.

16. The method of claim 1, wherein said installing comprises installation of at least one wired device, including:
   physically installing the at least one wired device according to type and location taken from said design of said network accessed by said commissioning tool;
   marking said physically installed at least one wired device on said commissioning tool; and
   downloading data from said commissioning tool to said at least one wired device using a user interface comprised in said commissioning tool.

17. A system for forming and controlling of networks that comprises wired and wireless devices and wired and wireless links, the system comprising:
   a design system for creating and storing a design of a network, said design comprises parameters and design configuration data of devices designed to be in said network and binding information defining bindings to allow connection between devices to run an application;
   configuration adapters comprised in devices to be installed according to said design; and
   a control system comprising at least one commissioning tool, the control system is for installing said devices by accessing said created design by a commissioning tool and downloading data from said commissioning tool into said configuration adapters before the devices are initialized, so that the installed devices form the network and the bindings according to the created design by reading said downloaded data from the configuration adapters once the devices are initialized; and
   wherein said commissioning tool comprises a configuration adapter for a complementary configuration link, wherein of the configuration adapters included in the system, only said configuration adapter of said commissioning tool must be powered-up during data communication between said at least one commissioning tool and said devices.

18. The system of claim 17, wherein said created design of a network comprises a wired communication link to connect at least one wired device in a wired network to a wireless device.

19. The system of claim 18, wherein said wired communication link is for connecting said at least one wired device in said wired network to an access point.

20. The system of claim 18, wherein said created design of a network comprises:
   a wireless device, wherein said wireless device has a wired communication interface for communicating with said wired network through said wired communication link;
   a wireless network, said wireless network including at least one wireless device; and
   a wireless communication link, wherein said wireless communication link is interconnecting said at least one wireless device in said wireless network.

21. The system of claim 17, wherein said configuration adapters comprise a configuration interface and a device contact interface.

22. The system of claim 17, wherein:
   said created design of a network comprises at least one wired device having a configuration adapter, at least one wireless device having a configuration adapter and an access point having a configuration adapter,
   wherein said control system comprises a master controller for accessing said created design and forming the network once said devices are initialized according to said design and binding information comprised in said design.

23. The system of claim 21, wherein each of said configuration adapters comprises a configuration interface for loading data and a device contact interface for reading data, wherein said configuration interface is operating with no need to power-up the corresponding configuration adapter.

24. The system of claim 19, wherein said created design of a network comprises:
   a wireless device, wherein said wireless device has a wired communication interface for communicating with said wired network through said wired communication link;
   a wireless network, said wireless network including at least one wireless device; and
   a wireless communication link, wherein said wireless communication link is interconnecting said at least one wireless device in said wireless network.

25. The system of claim 17, comprising:
   an access point operatively connected to said master controller through a design/control system interface.

* * * * *